(12) United States Patent
Calvet et al.

(10) Patent No.: US 9,899,938 B2
(45) Date of Patent: Feb. 20, 2018

(54) MINIATURE MEMS ACTUATOR ASSEMBLIES

(71) Applicant: DigitalOptics Corporation MEMS, San Jose, CA (US)

(72) Inventors: Robert J. Calvet, Arcadia, CA (US); Guiqin Wang, Arcadia, CA (US); Roman C. Gutierrez, Arcadia, CA (US); Xiaolei Liu, Arcadia, CA (US)

(73) Assignee: DigitalOptics Corporation MEMS, San Jose, CA (US)

( * ) Notice: Subject to any disclaimer, the term of this patent is extended or adjusted under 35 U.S.C. 154(b) by 67 days.

(21) Appl. No.: 14/746,724

(22) Filed: Jun. 22, 2015

(65) Prior Publication Data

US 2015/0372617 A1    Dec. 24, 2015

Related U.S. Application Data

(63) Continuation of application No. 14/543,847, filed on Nov. 17, 2014, now Pat. No. 9,063,278, which is a
(Continued)

(51) Int. Cl.
*G02B 7/02* (2006.01)
*H02N 1/00* (2006.01)
(Continued)

(52) U.S. Cl.
CPC ............... *H02N 1/008* (2013.01); *G02B 7/08* (2013.01); *G02B 7/09* (2013.01); *G02B 13/001* (2013.01);
(Continued)

(58) Field of Classification Search
CPC ... G02B 7/04; G02B 7/02; G02B 7/00; G02B 7/005; G02B 7/023; H02N 1/008;
(Continued)

(56) References Cited

U.S. PATENT DOCUMENTS 2,774,001 A    12/1956  Riedel
4,333,722 A     6/1982  Lee
(Continued)

FOREIGN PATENT DOCUMENTS

CN    1661902       8/2005
CN    101047226    10/2007
(Continued)

OTHER PUBLICATIONS

Koga et al., "Electrostatic Linear Microactuator Mechanism for Focusing a CCD Camera", Journal of Lightwave Technology, vol. 17, No. 1, Jan. 1999, pp. 43-47.
(Continued)

*Primary Examiner* — Joseph P Martinez

(57) ABSTRACT

In one embodiment, an electrostatic actuator includes a generally planar fixed frame, a generally planar moving frame coupled to the fixed frame by a flexure for substantially coplanar, perpendicular movement relative to the fixed frame, a plurality of interdigitated teeth, a fixed portion of which is attached to the fixed frame and a moving portion of which is attached to the moving frame, and an elongated output shaft having opposite input and output ends, the input end being coupled to the moving frame.

20 Claims, 13 Drawing Sheets

Related U.S. Application Data continuation of application No. 13/843,107, filed on Mar. 15, 2013, now Pat. No. 8,947,797, which is a continuation-in-part of application No. 12/946,515, filed on Nov. 15, 2010, now Pat. No. 8,619,378, and a continuation-in-part of application No. 13/247,895, filed on Sep. 28, 2011, now Pat. No. 9,019,390, and a continuation-in-part of application No. 13/247,888, filed on Sep. 28, 2011, now Pat. No. 8,941,191, which is a continuation-in-part of application No. 12/946,670, filed on Nov. 15, 2010, now Pat. No. 8,803,256, and a continuation-in-part of application No. 12/946,657, filed on Nov. 15, 2010, now Pat. No. 8,608,393, and a continuation-in-part of application No. 12/946,646, filed on Nov. 15, 2010, now Pat. No. 8,430,580, said application No. 13/843,107 is a continuation-in-part of application No. 13/247,898, filed on Sep. 28, 2011, now Pat. No. 8,768,157.

(51) Int. Cl.
  G02B 7/08    (2006.01)
  G03B 3/10    (2006.01)
  G03B 13/00   (2006.01)
  G03B 17/00   (2006.01)
  G02B 7/09    (2006.01)
  G02B 13/00   (2006.01)

(52) U.S. Cl.
  CPC .......... *G03B 3/10* (2013.01); *G03B 13/00* (2013.01); *G03B 17/00* (2013.01); *G03B 2205/0007* (2013.01); *G03B 2205/0046* (2013.01); *G03B 2205/0053* (2013.01); *G03B 2205/0061* (2013.01); *Y10T 29/49826* (2015.01)

(58) Field of Classification Search
  CPC .......... G03B 3/10; G03B 17/00; G03B 13/00; G03B 2205/0053; G03B 2205/0061; G03B 2205/0069; G03B 2205/0084
  See application file for complete search history.

(56) References Cited

U.S. PATENT DOCUMENTS

| | | | |
|---|---|---|---|
| 4,384,778 A | 5/1983 | Lee et al. |
| 4,408,857 A | 10/1983 | Frank |
| 4,496,217 A | 1/1985 | Aoyagi |
| 4,716,432 A | 12/1987 | Stephany |
| 4,860,040 A | 8/1989 | Tamamura et al. |
| 5,150,260 A | 9/1992 | Chigira |
| 5,386,294 A | 1/1995 | Ototake et al. |
| 5,699,621 A | 12/1997 | Trumper et al. |
| 5,780,948 A | 7/1998 | Lee et al. |
| 5,825,560 A | 10/1998 | Ogura et al. |
| 5,867,302 A | 2/1999 | Fleming |
| 5,986,826 A | 11/1999 | Kosaka et al. |
| 5,994,159 A | 11/1999 | Aksyuk et al. |
| 5,995,688 A | 11/1999 | Aksyuk et al. |
| 5,998,906 A | 12/1999 | Jerman et al. |
| 6,033,131 A | 3/2000 | Ghosh et al. |
| 6,068,801 A | 5/2000 | Bodo et al. |
| 6,167,809 B1 | 1/2001 | Robinson et al. |
| 6,205,267 B1 | 3/2001 | Aksyuk et al. |
| 6,239,473 B1 | 5/2001 | Adams et al. |
| 6,262,827 B1 | 7/2001 | Ueda et al. |
| 6,291,875 B1 | 9/2001 | Clark et al. |
| 6,300,156 B1 | 10/2001 | Decker et al. |
| 6,384,510 B1 | 5/2002 | Grade et al. |
| 6,392,703 B1 | 5/2002 | Uchino et al. |
| 6,426,777 B1 | 7/2002 | Sato |
| 6,493,631 B1 | 12/2002 | Burns |
| 6,497,141 B1 | 12/2002 | Turner et al. |
| 6,520,777 B2 | 2/2003 | Cho et al. |
| 6,535,311 B1 | 3/2003 | Lindquist |
| 6,590,313 B2 | 7/2003 | Agrawal et al. |
| 6,675,671 B1 | 1/2004 | Jokiel, Jr. et al. |
| 6,679,055 B1 | 1/2004 | Ellis |
| 6,771,001 B2 | 8/2004 | Mao et al. |
| 6,806,991 B1 | 10/2004 | Sarkar et al. |
| 6,845,669 B2 | 1/2005 | Acar et al. |
| 6,847,907 B1 | 1/2005 | Novotny |
| 6,850,675 B1 | 2/2005 | Calvet et al. |
| 6,914,635 B2 | 7/2005 | Ostergard |
| 6,936,943 B2 | 8/2005 | Wasson |
| 6,950,570 B1 | 9/2005 | Novotny |
| 6,958,777 B1 | 10/2005 | Pine |
| 7,027,206 B2 | 4/2006 | Mochizuki |
| 7,038,150 B1 | 5/2006 | Polosky et al. |
| 7,071,594 B1 | 7/2006 | Yan et al. |
| 7,113,688 B2 | 9/2006 | Calvet et al. |
| 7,148,603 B1 | 12/2006 | Garcia et al. |
| 7,154,199 B2 | 12/2006 | Yasuda |
| 7,190,854 B1 | 3/2007 | Novotny et al. |
| 7,224,883 B2 | 5/2007 | Gulvin et al. |
| 7,242,825 B2 | 7/2007 | Lin et al. |
| 7,266,272 B1 | 9/2007 | Calvet et al. |
| 7,279,761 B2 | 10/2007 | Acar et al. |
| 7,285,879 B2 | 10/2007 | Osaka |
| 7,359,131 B1 | 4/2008 | Gutierrez et al. |
| 7,372,074 B2 | 5/2008 | Milne et al. |
| 7,436,207 B2 | 10/2008 | Rogers et al. |
| 7,468,571 B2 | 12/2008 | Harada et al. |
| 7,477,842 B2 | 1/2009 | Gutierrez |
| 7,479,402 B2 | 1/2009 | Yu |
| 7,545,591 B1 | 6/2009 | Tong et al. |
| 7,555,210 B2 | 6/2009 | Calvet |
| 7,557,470 B2 | 7/2009 | Culpepper et al. |
| 7,579,848 B2 | 8/2009 | Bottoms et al. |
| 7,586,702 B1 | 9/2009 | Huang et al. |
| 7,592,737 B2 | 9/2009 | Bourbon et al. |
| 7,645,627 B2 | 1/2010 | Christenson et al. |
| 7,646,969 B2 | 1/2010 | Calvet et al. |
| 7,705,909 B2 | 4/2010 | Ishizawa et al. |
| 7,720,366 B2 | 5/2010 | Iwasaki et al. |
| 7,796,847 B2 | 9/2010 | Kubby et al. |
| 7,838,322 B1 | 11/2010 | Vargo et al. |
| 7,855,489 B2 | 12/2010 | Hirano |
| 7,872,394 B1 | 1/2011 | Gritters et al. |
| 7,986,449 B2 | 7/2011 | Davis et al. |
| 7,990,628 B1 | 8/2011 | Calvet et al. |
| 8,004,780 B2 | 8/2011 | Gutierrez et al. |
| 8,154,378 B2 | 4/2012 | Aksyuk et al. |
| 8,178,936 B2 | 5/2012 | Zhe et al. |
| 8,289,614 B1 | 10/2012 | Calvet et al. |
| 8,299,598 B2 | 10/2012 | Moden |
| 8,337,103 B2 | 12/2012 | Gutierrez |
| 8,358,925 B2 | 1/2013 | Gutierrez et al. |
| 8,391,700 B2 | 3/2013 | Gutierrez et al. |
| 8,430,580 B2 | 4/2013 | Gutierrez et al. |
| 8,547,627 B2 | 10/2013 | Jain et al. |
| 8,604,663 B2 | 12/2013 | Gutierrez et al. |
| 8,605,375 B2 | 12/2013 | Gutierrez et al. |
| 8,608,393 B2 | 12/2013 | Gutierrez et al. |
| 8,619,378 B2 | 12/2013 | Gutierrez |
| 8,637,961 B2 | 1/2014 | Gutierrez et al. |
| 8,768,157 B2 | 7/2014 | Gutierrez et al. |
| 8,884,381 B2 | 11/2014 | Jain et al. |
| 2001/0004420 A1 | 6/2001 | Kuwana et al. |
| 2002/0006687 A1 | 1/2002 | Lam |
| 2002/0067103 A1 | 6/2002 | Jerman |
| 2002/0070634 A1 | 6/2002 | Tai et al. |
| 2002/0105699 A1 | 8/2002 | Miracky et al. |
| 2002/0125789 A1 | 9/2002 | Brandt |
| 2002/0130586 A1 | 9/2002 | Mao et al. |
| 2003/0026547 A1 | 2/2003 | Trzecieski |
| 2003/0048036 A1 | 3/2003 | Lemkin |
| 2003/0062422 A1 | 4/2003 | Fateley et al. |
| 2003/0063838 A1 | 4/2003 | Hagood |
| 2003/0076421 A1 | 4/2003 | Dutta |
| 2003/0086751 A1 | 5/2003 | Culpepper |

(56) References Cited

U.S. PATENT DOCUMENTS

| | | |
|---|---|---|
| 2003/0210116 A1 | 11/2003 | Lane et al. |
| 2004/0017620 A1 | 1/2004 | Kaneko et al. |
| 2004/0048410 A1 | 3/2004 | O'Brien et al. |
| 2004/0066494 A1 | 4/2004 | Lee et al. |
| 2004/0136680 A1 | 7/2004 | Medina et al. |
| 2004/0149035 A1 | 8/2004 | Acar et al. |
| 2004/0183936 A1 | 9/2004 | Kim et al. |
| 2004/0184132 A1 | 9/2004 | Novotny et al. |
| 2004/0189969 A1 | 9/2004 | Mizuno |
| 2004/0201773 A1 | 10/2004 | Ostergard |
| 2005/0000311 A1 | 1/2005 | Storm |
| 2005/0002008 A1 | 1/2005 | De Weerdt et al. |
| 2005/0002086 A1 | 1/2005 | Starkweather et al. |
| 2005/0007489 A1 | 1/2005 | Ahn et al. |
| 2005/0095813 A1 | 5/2005 | Zhu et al. |
| 2005/0139542 A1 | 6/2005 | Dickensheets et al. |
| 2005/0148433 A1 | 7/2005 | Wang et al. |
| 2005/0156481 A1* | 7/2005 | Zhou ............... G02B 26/0808 310/309 |
| 2005/0219399 A1 | 10/2005 | Sato et al. |
| 2005/0249487 A1 | 11/2005 | Gutierrez |
| 2006/0028320 A1 | 2/2006 | Osaka |
| 2006/0033938 A1 | 2/2006 | Kopf et al. |
| 2006/0056084 A1 | 3/2006 | Araki |
| 2006/0092514 A1 | 5/2006 | Koo et al. |
| 2006/0153556 A1 | 7/2006 | Lee et al. |
| 2006/0183332 A1 | 8/2006 | Kang |
| 2006/0192858 A1 | 8/2006 | Calvet |
| 2006/0193618 A1 | 8/2006 | Calvet |
| 2006/0204242 A1 | 9/2006 | Gutierrez et al. |
| 2006/0209012 A1 | 9/2006 | Hagood, IV |
| 2006/0219006 A1 | 10/2006 | Nasiri et al. |
| 2006/0250325 A1 | 11/2006 | Hagood et al. |
| 2006/0252297 A1 | 11/2006 | Culpepper |
| 2006/0277997 A1 | 12/2006 | Foster et al. |
| 2007/0024155 A1 | 2/2007 | Calvet |
| 2007/0133976 A1 | 6/2007 | Gutierrez et al. |
| 2007/0216888 A1 | 9/2007 | Kugler et al. |
| 2007/0220882 A1 | 9/2007 | Culpepper et al. |
| 2007/0263996 A1 | 11/2007 | Iwasaki et al. |
| 2008/0020573 A1 | 1/2008 | Birkmeyer et al. |
| 2008/0031609 A1 | 2/2008 | Rukes |
| 2008/0044172 A1 | 2/2008 | Tang et al. |
| 2008/0054757 A1 | 3/2008 | Aksyuk et al. |
| 2008/0152332 A1 | 6/2008 | Koo et al. |
| 2008/0198249 A1 | 8/2008 | Tanimura et al. |
| 2008/0240704 A1 | 10/2008 | Takahashi |
| 2008/0279498 A1 | 11/2008 | Sampsell et al. |
| 2008/0309191 A1 | 12/2008 | Chou et al. |
| 2009/0031548 A1 | 2/2009 | Zaitsu et al. |
| 2009/0152980 A1 | 6/2009 | Huang |
| 2009/0185796 A1 | 7/2009 | Tsutsumi et al. |
| 2009/0213236 A1 | 8/2009 | Chiou et al. |
| 2009/0244302 A1 | 10/2009 | Tsai |
| 2009/0244668 A1 | 10/2009 | Fujino et al. |
| 2009/0284816 A1 | 11/2009 | Davis et al. |
| 2009/0310959 A1 | 12/2009 | Shih et al. |
| 2010/0232777 A1 | 9/2010 | Tseng et al. |
| 2010/0284081 A1 | 11/2010 | Gutierrez et al. |
| 2011/0026148 A1 | 2/2011 | Tanimura et al. |
| 2012/0032286 A1 | 2/2012 | Trusov et al. |
| 2012/0081598 A1 | 4/2012 | Calvet et al. |
| 2012/0119324 A1 | 5/2012 | Jain et al. |
| 2012/0119425 A1 | 5/2012 | Gutierrez et al. |
| 2012/0119614 A1 | 5/2012 | Gutierrez |
| 2012/0120297 A1 | 5/2012 | Gutierrez |
| 2012/0120308 A1 | 5/2012 | Gutierrez et al. |

FOREIGN PATENT DOCUMENTS

| | | |
|---|---|---|
| CN | 101196613 | 6/2008 |
| CN | 102265201 A | 11/2011 |
| EP | 0978832 | 2/2000 |
| EP | 1855145 | 11/2007 |
| EP | 1959284 | 8/2008 |
| EP | 2264507 | 12/2010 |
| JP | 2006-297543 | 11/2006 |
| JP | 2008-010624 | 1/2008 |
| JP | 2010-145264 | 7/2010 |
| JP | 2010-167536 | 8/2010 |
| KR | 2008/0079115 | 8/2008 |
| WO | WO 99/37013 | 7/1999 |
| WO | WO 01/96930 | 12/2001 |
| WO | WO 2002/063371 | 8/2002 |
| WO | WO 2008/061025 | 5/2008 |
| WO | WO 2010/038229 | 4/2010 |

OTHER PUBLICATIONS

Tsuboi et al., "A Rotational Comb-Driven Micromirror With a Large Deflection Angle and Low Drive Voltage," Technical Digest. MEMS. IEEE International Conference on Microelectro Mechanical Systems, Jan. 20, 2002, pp. 532-535.

Chiu et al., "Design, Fabrication, and Control of Components in MEMS-Based Optical Pickups," IEEE Transactions on Magnetics, IEEE Service Center, New York, US, vol. 17, No. 2, Feb. 1, 2007, pp. 780-784.

Wu et al., "Development of tracking and focusing micro actuators for dual-stage optical pick-up head," Journal of Optics A: Pure and Applied Optics, Institute of Physics Publishing, Bristol, GB, vol. 8, No. 7, Jul. 1, 2006, pp. S323-S329.

Kim et al., "Integrated Micro Optical Flying Head With Lens Positioning Actuator for Small Form Factor Data Storage," Transducers '03. 12$^{th}$ International Conference on Solid-State Sensors, Actuators and Microsystems, Digest of Technical Papers (Cat. No. 03TH8664), vol. 1, Jun. 8-12, 2003, pp. 607-610.

Kwon et al., "Large-Displacement Vertical Microlens Scanner With Low Driving Voltage," IEEE Photonics Technology Letters, IEEE Service Center, Piscataway, NJ, US, vol. 14, No. 11, Nov. 2002, pp. 1572-1574.

Takahashi et al., "Switched-Layer Design for SOI Bulk Micromachined XYZ Stage Using Stiction Bar for Interlayer Electrical Connection," Journal of Microelectromechanical Systems, IEEE Service Center, US, vol. 18, No. 4, Aug. 2009, pp. 818-827.

\* cited by examiner

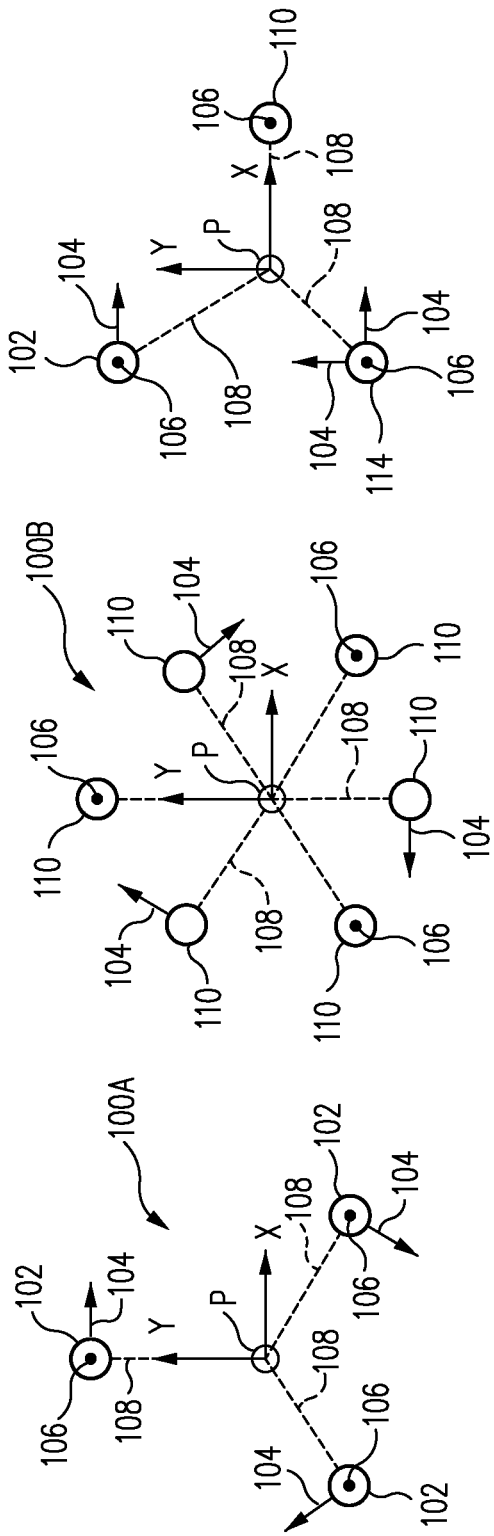

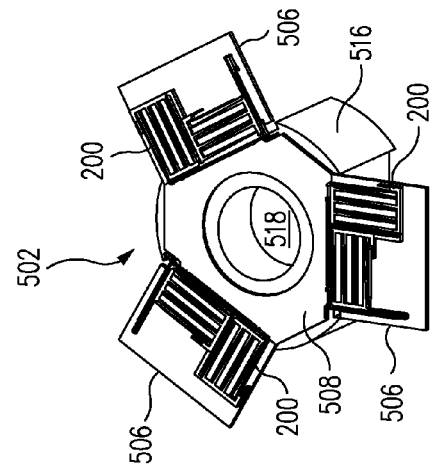
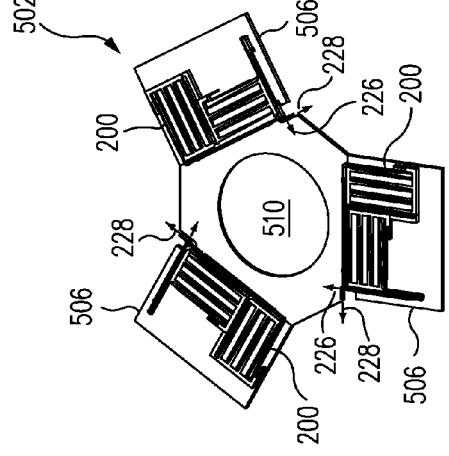
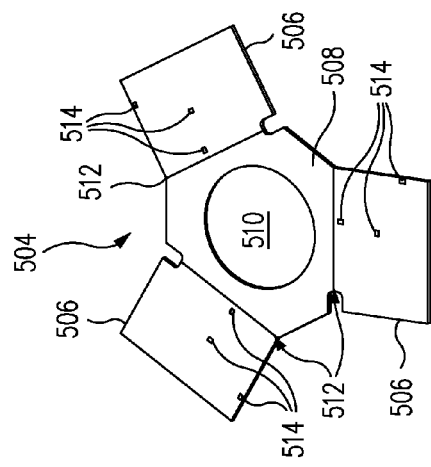
FIG. 5A
FIG. 5B
FIG. 5C
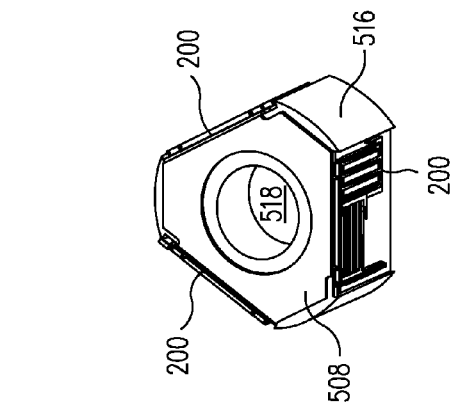
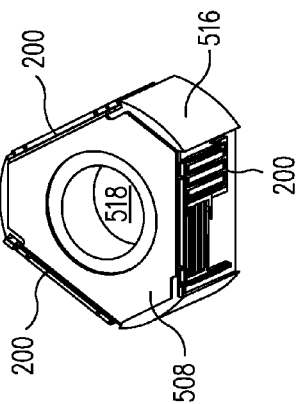
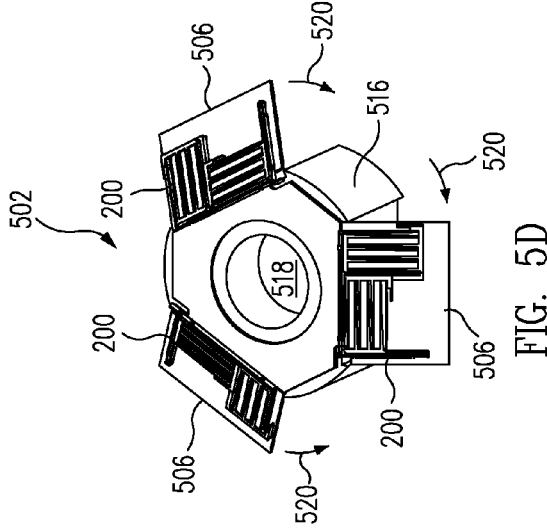
FIG. 5D
FIG. 5E
FIG. 5F

MINIATURE MEMS ACTUATOR ASSEMBLIES

CROSS-REFERENCE TO RELATED APPLICATIONS

This application is a continuation of U.S. patent application Ser. No. 14/543,847, filed Nov. 17, 2014, which is hereby incorporated by reference in its entirety.

U.S. patent application Ser. No. 14/543,847 is a continuation of and claims the benefit of and priority to U.S. patent application Ser. No. 13/843,107, filed Mar. 15, 2013 and entitled "MINIATURE MEMS ACTUATOR ASSEMBLIES" which is hereby incorporated by reference in its entirety.

U.S. patent application Ser. No. 13/843,107 is a continuation-in-part of and claims the benefit of and priority to U.S. patent application Ser. No. 12/946,515 filed Nov. 15, 2010 and entitled "ROTATIONAL COMB DRIVE Z-STAGE" which is hereby incorporated by reference in its entirety.

U.S. patent application Ser. No. 13/843,107 is a continuation-in-part of and claims the benefit of and priority to U.S. patent application Ser. No. 13/247,895 filed Sep. 28, 2011 and entitled "OPTICAL IMAGE STABILIZATION USING TANGENTIALLY ACTUATED MEMS DEVICES" which is hereby incorporated by reference in its entirety.

U.S. patent application Ser. No. 13/843,107 is a continuation-in-part of and claims the benefit of and priority to U.S. patent application Ser. No. 13/247,888 filed Sep. 28, 2011 and entitled "MEMS ACTUATOR DEVICE DEPLOYMENT" which is hereby incorporated by reference in its entirety.

U.S. patent application Ser. No. 13/247,888 is a continuation-in-part of and claims the benefit of and priority to U.S. patent application Ser. No. 12/946,670 entitled "LINEARLY DEPLOYED ACTUATORS", Ser. No. 12/946,657 entitled "CAPILLARY ACTUATOR DEPLOYMENT", and Ser. No. 12/946,646 entitled "ROTATIONALLY DEPLOYED ACTUATORS", all filed Nov. 15, 2010, the entire disclosure of each of which are hereby incorporated by reference in their entirety.

U.S. patent application Ser. No. 13/843,107 is a continuation-in-part of and claims the benefit of and priority to U.S. patent application Ser. No. 13/247,898 filed Sep. 28, 2011 and entitled "MULTIPLE DEGREE OF FREEDOM ACTUATOR" which is hereby incorporated by reference in its entirety.

TECHNICAL FIELD

One or more embodiments of the invention generally relates to actuators for optical elements, such as mirrors or lenses, and more particularly for example, to embodiments of actuator assemblies useful in, for example, miniature cameras and the like, that provide movement in multiple degrees of freedom.

RELATED ART

Actuators for use in miniature cameras and other devices are well known. Such devices typically comprise voice coils that are used to move a lens for focusing, zooming, or optical image stabilization.

Microelectromechanical systems (MEMS) actuators are also known. Examples of MEMS actuators include comb drives, scratch drives, and thermal drives. Microminiature MEMS actuators can be made using well known integrated circuit (IC) fabrication techniques. MEMS actuators can be used in a variety of applications. For example, MEMS actuators can be used to move a lens to so as to facilitate autofocus, zoom and image stabilization functions in miniature cameras. Accordingly, it is desirable to provide improved MEMS actuator devices for such applications.

Miniature cameras can be used in a variety of different electronic devices. For example, miniature cameras are commonly used in cellular telephones, laptop computers, and surveillance devices and in many other applications. As the size of electronic devices continues to shrink, the size of miniature cameras that are part of such devices typically must be reduced as well. In light of this, it becomes desirable to provide ways and means for reducing the size of miniature cameras, while at the same time retaining the advanced functionalities of larger, more expensive standalone cameras.

Accordingly, a need exists for actuator assemblies useful in, for example, miniature cameras and the like that are small, easier and less costly to manufacture, and which are capable of providing movement of optical elements in multiple degrees of freedom to effect a variety of functions.

SUMMARY

In accordance with one or more embodiments of the present disclosure, various embodiments of miniature actuator assemblies are provided, together with methods for making and using them, that are useful in, for example, miniature cameras and the like, that are small, easier and less costly to manufacture, and that are capable of providing movement of optical elements in multiple degrees of freedom to effect a variety of functions.

In one example embodiment, an electrostatic actuator includes a generally planar fixed frame, a generally planar moving frame coupled to the fixed frame by a flexure for substantially coplanar, perpendicular movement relative to the fixed frame, a plurality of interdigitated teeth, a fixed portion of which is attached to the fixed frame and a moving portion of which is attached to the moving frame, and an elongated output shaft having opposite input and output ends, the input end being coupled to the moving frame.

In another embodiment, an electrostatic actuator device includes an L-shaped support frame having an upright leg and a lateral leg extending perpendicularly therefrom, an output coupler, and a pair of the above actuators. The output ends of the output shafts of the actuators are coupled to the output coupler, the fixed frame of a first one of the actuators is attached to the upright leg such that the output shaft of the first actuator moves the output coupler rectilinearly and in a first direction, and the fixed frame of a second one of the actuators is attached to the lateral leg such that the output shaft of the second actuator moves the output coupler rectilinearly and in a second direction perpendicular to the first direction.

The actuators and actuator devices can be used for making a variety of miniature lens barrels and miniature camera modules of the type used in electronic host devices, such as mobile phones, computers and the like.

The scope of this invention is defined by the claims appended hereafter, which are incorporated into this section by reference. A more complete understanding of the features and advantages of the novel miniature actuator assemblies of the disclosure and the methods for making and using them will be afforded to those skilled in the art by a consideration of the detailed description of some example embodiments thereof presented below, particularly if such consideration is made in conjunction with the appended drawings, briefly described below, wherein like reference numerals are used to identify like elements illustrated in one or more of the figures thereof.

BRIEF DESCRIPTION OF THE SEVERAL VIEWS OF THE DRAWINGS

FIG. 1A is a schematic representation of an actuator assembly incorporating three actuators, each capable of two degrees of freedom (two-DOF) of orthogonal movement in accordance with an embodiment of the disclosure.

FIG. 1B is a schematic representation of an actuator assembly incorporating three actuators, each capable of one-DOF of movement in accordance with an embodiment of the disclosure.

FIG. 1C is a schematic representation of an actuator assembly incorporating three actuators, one capable of three-DOF of orthogonal movement, one capable of two degrees of freedom of orthogonal movement, and one capable of one-DOF of movement in accordance with an embodiment of the disclosure.

FIGS. 5A-5H are top-and-side perspective views of the sequential steps of an example embodiment of a method for assembling a miniature lens barrel assembly utilizing a plurality of the 2DOF actuator devices of FIG. 2B in accordance with an embodiment of the disclosure.

DETAILED DESCRIPTION

Figure 2A:
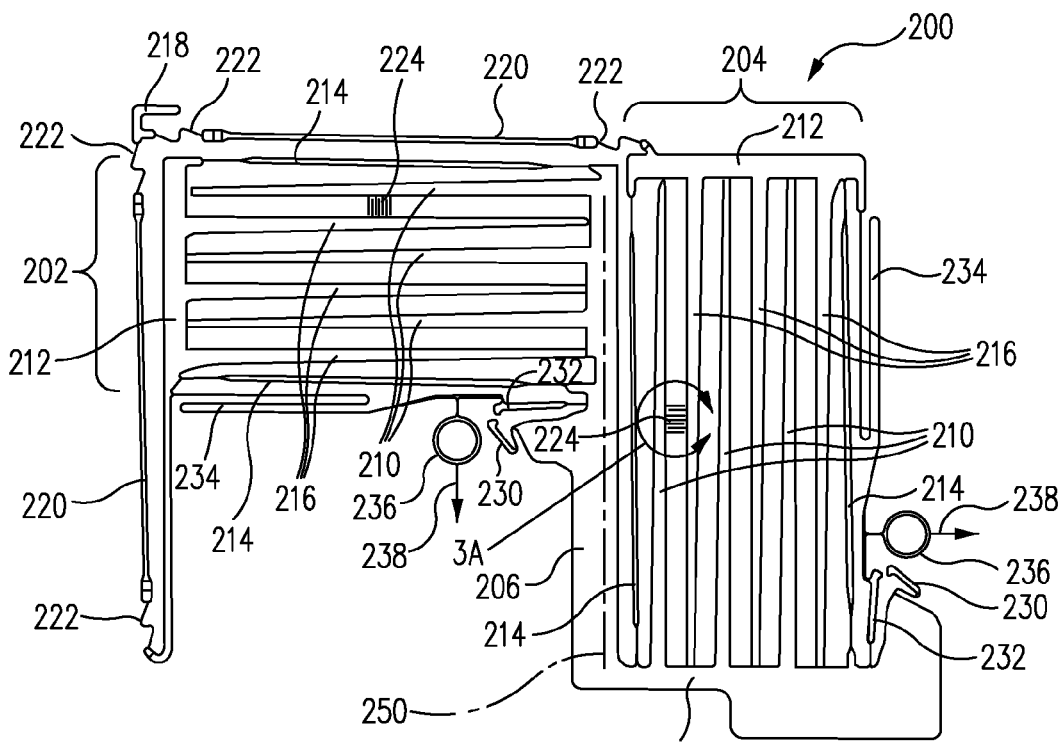
FIG. 2A is a top plan view of an example embodiment of a two-DOF actuator device in accordance with an embodiment of the disclosure, shown in an as-fabricated state and prior to its deployment for operational use.

In accordance with embodiments of the present invention, miniature actuator assemblies are provided, together with methods for making and using them, that are useful in, for example, miniature cameras and the like, and that are capable of providing precisely controlled movement of optical elements in multiple degrees of freedom (DOFs) to effect a variety of functions, such as focusing, zooming and image stabilization (IS) functions.

As used herein, a "one-, two-, or three-DOF actuator" is an actuator that is capable of exerting a force on an object in one, two or three directions, respectively, which directions are, except for the first actuator, mutually orthogonal. Actuator devices or assemblies can be confected using such actuators that are capable of driving a "payload," such as a lens, in one or more directions of rectilinear and/or rotational movement relative to an X, Y, Z coordinate system, i.e., $\pm X$, $\pm Y$, $\pm Z$, $\pm \theta_X$, $\pm \theta_Y$ and/or $\pm \theta_Z$.

For example, an embodiment of an actuator device incorporating three one-DOF actuators that is capable of moving a payload, e.g., a mounting platform and lens in 3 DOFs of movement, viz., ±Z, ±θ$_X$ and ±θ$_Y$, is described in commonly owned U.S. patent application Ser. No. 12/946,515, filed Nov. 15, 2010, the entire disclosure of which is incorporated herein by reference.

Another embodiment of an actuator device incorporating three one-DOF actuators that is capable of moving a payload in 3 DOFs of movement, viz., ±X, ±Y and ±θ$_Z$, is described in commonly owned U.S. patent application Ser. Nos. 13/247,895 and 13/247,888, both filed Sep. 28, 2011, both entire disclosures of which are incorporated herein by reference.

Yet another embodiment of an actuator device incorporating three two-DOF actuators that is capable of moving a payload in six DOFs of movement, viz., ±X, ±Y, ±Z, ±θ$_X$, =θ$_Y$ and ±θ$_Z$, is described in commonly owned U.S. patent application Ser. No. 13/247,898, filed Sep. 28, 2011, the entire disclosure of which is incorporated herein by reference.

As discussed in the foregoing references, the multiple DOF actuator devices can be advantageously fabricated as monolithic, generally planar microelectromechanical (MEMS) structures incorporating electrostatic "comb drives" from a silicon wafer using well-known wafer-scale photolithographic techniques.

FIGS. 1A-1C are schematic representations of three actuator devices or assemblies 100A, 100B and 100C, each incorporating a plurality of actuators, each of which is capable of either one-, two- or three-DOFs of movement. Each of the three actuators 100A, 100B and 100C is capable of moving a payload P, centered on the Z axis, in six DOFs of movement, viz., ±X, ±Y, ±Z, ±θ$_X$, ±θ$_Y$ and ±θ$_Z$.

For example, in FIG. 1A, the actuator assembly 100A comprises three two-DOF actuators 102, i.e., each capable of exerting an "in-plane" force 104, i.e., one lying in the X-Y plane, and an "out-of-plane" force 106, i.e., one normal to the X-Y plane. Each of the actuators 102 is coupled to the payload P by flexures, represented by the dashed lines 108, such that the respective in-plane forces 104 exerted by the actuators 102 act tangentially on the payload P. Thus, simultaneous in-plane actuation of the actuators 102 causes rotation of the payload P about the Z axis, i.e., ±θ$_Z$ displacement, and independent in-plane actuation of the actuators 102 can cause translation of the payload P along an axis in the X-Y plane, i.e., ±X and/or ±Y displacements. Similarly, simultaneous actuation of the actuators 102 in the out-of-plane direction causes translation of the payload P along the Z axis, i.e., ±Z displacement, and independent out-of-plane actuation of the actuators 102 causes rotation of the payload P about an axis lying in the X-Y plane, i.e., ±θ$_X$ and/or ±θ$_Y$ displacements.

In FIG. 1B, the actuator assembly 100B comprises six one-DOF actuators 110, three of which are capable of exerting an in-plane force 104, and three of which are capable of exerting an out-of-plane force 106, i.e., normal to the X-Y plane. As those of some skill will appreciate, suitable in-plane and/or out-plane actuation of each of the six one-DOF actuators 110 will result in movement of the payload P in six DOFs, viz., ±X, ±Y, ±Z, ±θ$_X$, ±θ$_Y$ and ±θ$_Z$.

In FIG. 1C, the actuator assembly 100C incorporates three actuators, viz., one 3-DOF actuator 114, i.e., one capable of exerting 2 orthogonal in-plane forces 104 and one out-of plane force 106, as well as one 2-DOF actuator 102 and one one-DOF actuator 110 of the types described above. And as above, suitable simultaneous and/or independent actuation of the three actuators 102, 110 and 114 will result in movement of the payload P in six DOFs, viz., ±X, ±Y, ±Z, ±θX, ±θY and ±θZ.

In the context of miniature cameras, for example, cellphone cameras, it is desirable to provide miniature, six DOF (or less) actuator assemblies for moving, e.g., a single lens, to effect, for example, autofocus, zooming and/or image stabilization functions. As discussed above in connection with FIG. 1A, one advantageous embodiment of a 6 DOF actuator assembly can include three two-DOF actuators, wherein each actuator has one out-of-plane or vertical (e.g., parallel to an optical axis of the lens) DOF and one in-plane, tangentially acting DOF.

However, as discussed above in U.S. patent application Ser. No. 13/247,898, fabrication of a 2 DOF actuator using MEMS techniques results, at least initially, in a generally planar actuator with two orthogonal in-plane actuation sections, and additional fabrication steps must be taken to convert one of these sections to out-of-plane operation. It therefore becomes desirable to provide alternative embodiments of actuator assembly methods that utilize exclusively planar arrangements. However, as discussed in more detail below, through the use of a flexible actuator assembly substrate, assembly and wiring of an actuator assembly can take place in a substantially planar fashion, and then the substrate can be folded into the final three-dimensional configuration necessary for the desired orthogonal in-plane and out-of-plane operation.

Figure 2B:
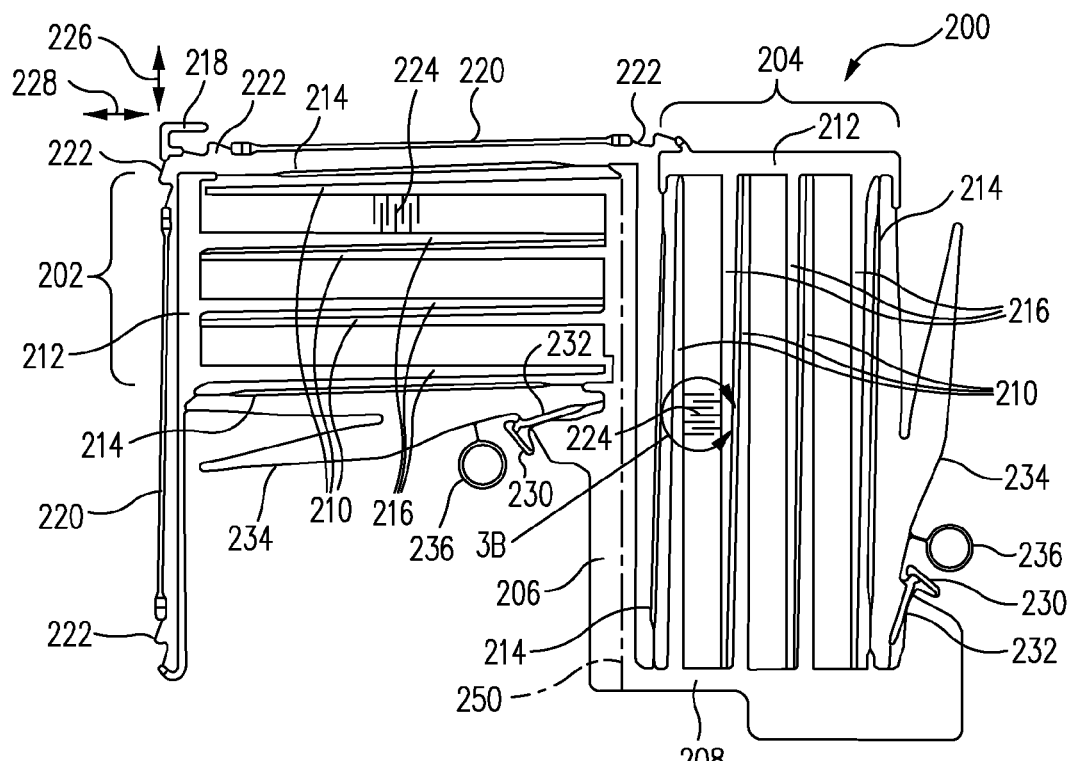
FIG. 2B is a top plan view of the example two-DOF actuator device of FIG. 2A, shown after being deployed for operational use in accordance with an embodiment of the disclosure.

FIG. 2A is a top plan view of an example embodiment of a two-DOF MEMS actuator device 200 in accordance with the present invention, shown in an as-fabricated state and prior to its "deployment" for operational use, and FIG. 2B is a top plan view of the example actuator device 200, shown after being deployed for use. As can be seen in FIGS. 2A and 2B, the actuator device 200 comprises two substantially similar one-DOF electrostatic comb drive actuators 202 and 204 coupled together in a mutually orthogonal arrangement by a fixed, L-shaped support frame comprising an upright leg 206 and a lateral leg 208 extending perpendicularly therefrom.

As illustrated in FIGS. 2A and 2B, in each actuator 202 and 204, respective pluralities of fixed frames 210 extend perpendicular to the fixed upright and lateral legs 206 and 208, and a moving or output leg 212 is coupled to a corresponding one of each of the upright and lateral legs 206 and 208 by a pair of elongated flexures 214 that are configured to enable each moving leg 212 to move substantially parallel to its corresponding upright or lateral leg 206 or 208. Respective pluralities of moving frames 216 extend perpendicular to each of the two moving legs 212. Each of the moving or output legs 212 of the two actuators 202 and 204 is coupled to a single output coupler 218 through an elongated output shaft 220. As discussed in more detail below, an output end of each output shaft 220 is coupled to the output coupler 218 by a first "cross-axis" or "monopod" flexure 222, and an input end of each output shaft 220 is coupled to an associated one of the output legs 212 through a second monopod flexure 222.

As further illustrated in FIGS. 2A and 2B, each of the fixed and moving frames 210 and 216 includes an associated plurality of electrostatic comb drive teeth 224 extending perpendicularly therefrom which are interdigitated with each other to define an electrostatic comb drive "bank." When a differential voltage is selectively applied to the fixed and moving frames 210 and 216 of the comb drive banks of a given actuator 202 or 204, the moving frames 210, and hence, the associated output leg 212 and output shaft 220 of the given actuator, are urged orthogonally toward or away from the associated fixed frames 210 of the actuator. Thus, actuation of the vertical one-DOF actuator 202 will result in a movement of the associated output shaft 220, and hence, the output coupler 218, in the plane of the actuator device 200 and vertically in the direction of the double-headed arrow 226 in FIG. 2B. Similarly, actuation of the lateral one-DOF actuator 204 will result in movement of the output coupler 218 in the plane of the actuator device 200 and laterally in the direction of the double-headed arrow 228 of FIG. 2B. As will be evident to those of some skill, the one-DOF actuators 202 and 204 can be simultaneously actuated with selective differential voltages so as to cause the output coupler 218, and hence, a "payload" coupled to it, to move in any direction lying in the plane of the actuator device 200.

In the particular example embodiment illustrated in FIGS. 2A and 2B, each of the actuators 202 and 204 includes three electrostatic comb banks. However, it should be understood that the number of comb banks, as well as the number, length, width and pitch of the teeth 224 of the comb banks, can be widely varied, depending on the particular application at hand.

Figure 3A:
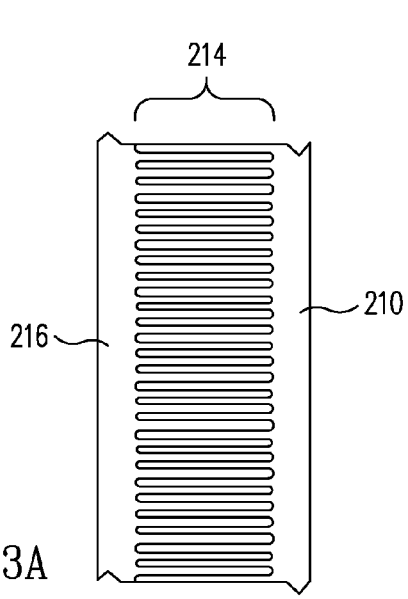
FIG. 3A is an enlarged partial detail plan view of fixed and moving frames and associated portions of interdigitated teeth of one of the actuators of the example actuator device of FIG. 2A, showing the relative position of the frames and teeth prior to deployment in accordance with an embodiment of the disclosure.

It should be further understood that, as discussed above, the interdigitated teeth 214 of the two one-DOF actuators of FIG. 2B are shown in a "deployed" position, i.e., spread apart from one another, for substantially rectilinear movement relative to each other. However, as illustrated in the enlarged detail view of the teeth 214 in FIG. 3A, it may be seen that the interdigitated teeth 214 of the actuators 202 and 204 are initially disposed after manufacture such that the associated fixed and moving frames 210 and 216 are spaced apart by about the length of the teeth 214 for manufacturing efficiencies. Accordingly, the application of a voltage differential to the teeth 214 in this configuration cannot result in any substantial in-plane rectilinear movement of the moving frames 216 toward the fixed frames 210, and hence, any corresponding movement of the output coupler 218 in the plane of the actuator device 200. Therefore, to effect the latter type of movement, each of the two actuators 202 and 204 must first be deployed into a configuration that enables this type of actuation.

In the particular example embodiment of FIGS. 2A and 2B, this deployment can include the provision of an over-center latch 230 on each of the upright and lateral legs 206 and 208. The latches 230 are respectively coupled to the upright and lateral legs 206 and 208 with, e.g., a spring flexure. Each of a pair of deployment levers 232 is respectively coupled to the associated moving frames 216 with a recurvate deployment flexure 234. Each of the deployment levers 232 has a surface disposed at an upper end of the lever that is configured as an inclined plane for a camming actuation of and a latching engagement with a corresponding one of the latches 230. A pull ring 236 can be attached to each of the deployment flexures 234 by a spring flexure adjacent to the upper end of the deployment levers 232.

Figure 3B:
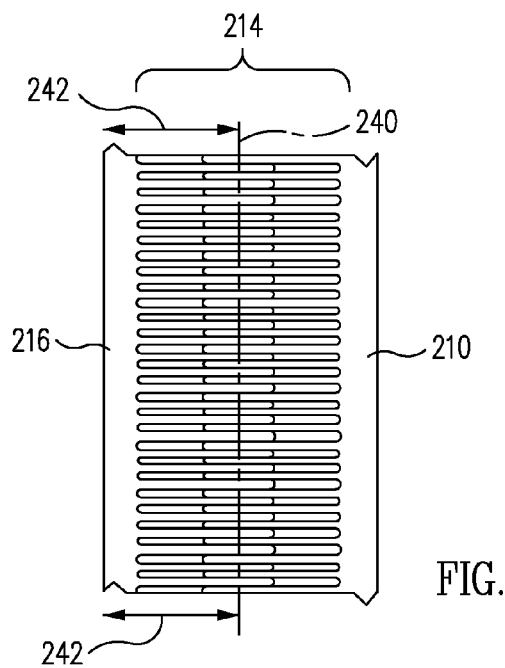
FIG. 3B is an enlarged partial detail plan view of the fixed and moving frames and associated portions of interdigitated teeth of one of the actuators of the example actuator device of FIG. 2B, showing the relative position of the frames and teeth after deployment in accordance with an embodiment of the disclosure.

During deployment, a force is applied to the pull ring 236 of each actuator 202 and 204 in the direction of the arrows 238 in FIG. 2A. This causes the deployment levers 232 to rotate relative to their associated upright or lateral legs 206 or 208. The rotation of the deployment levers 232 causes the deployment flexures 234 to urge the respective moving frames 216 rectilinearly and perpendicularly away from their associated fixed frames 210, and to the deployed position, where the camming surface at the upper end of the each deployment lever 232 first actuates, and is then engaged by, a corresponding one of the latches 230 so as to fix the moving frames 216 in the deployed position, as illustrated in FIG. 2B. This, in turn, results in a deployment of the teeth 214 of the moving frames 216 to the position, indicated by the phantom line 240 in the enlarged detail view of FIG. 3B, for movement relative to the teeth 214 of the fixed frames 210 in the direction indicated by the double-headed arrows 242 in FIG. 3B. The deployment levers 232 can then be, for example, adhesively bonded to their associated latches 230 to prevent the moving frames 216 and associated teeth 214 from returning to their previous, "undeployed" positions as a result of, e.g., vibration or shock acting on the actuator device 200. In this regard, it should be understood that, in some embodiments, after the actuators 202 and 204 have been deployed, the "deployment" components, i.e., the latches 230, deployment levers 232, deployment flexures 234 and pull rings 236 become redundant and serve no further purpose in the operation of the actuators 202 and 204. In other embodiments, such "deployment" components may be adapted to provide various biasing and/or other actuator forces, such as spring forces related to flexing of deployment flexures 234, for example, and/or other structurally-based influences (e.g., motion limits, shock mitigation, general alignment) on operation of actuators 202 and/or 204, throughout the operational life of actuators 202 and/or 204.

As those of some skill will understand, the elongated output shafts 220 of the actuators 202 and 204 are susceptible to "cross-talk" or "cross-coupling," i.e., non-axial forces exerted on one of the shafts 220 by the other shaft 220, or a force acting in a non-axial direction exerted by the associated moving leg 212 during actuation. Since both output shafts 220 are coupled to the single output coupler 218, this can lead to some imprecision in the positioning of the latter, and hence, in the positioning of any payload coupled to it for movement. However, it has been discovered that the cross-talk, parasitic stiffness, and/or cross-coupling problems can be substantially eliminated by the provision of the "monopod" flexures 222 described above.

Figure 4A:
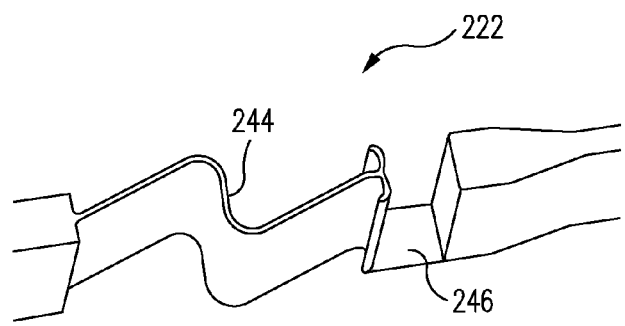
FIGS. 4A and 4B are upper, left side and upper, right side perspective views, respectively, of an example embodiment of a "monopod," or "cross-axis" flexure in accordance with an embodiment of the disclosure.
Figure 4B:
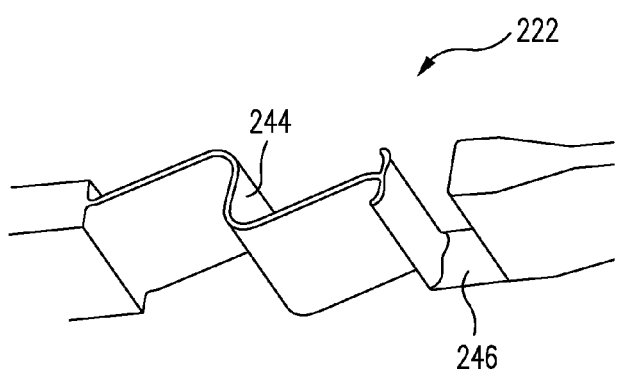

FIGS. 4A and 4B are upper, left side and upper, right side perspective views, respectively, of the monopod flexure 222 in accordance with one example embodiment of the present invention. As can be seen in the figures, the monopod flexure 222 can comprise two "solid hinges" coupled to each other end-to-end, i.e., a corrugated "in-plane" hinge 244 that is relatively stiff in an out-of-plane direction, i.e., one normal to the plane of the actuator device 200, and relatively flexible in an in-plane direction, and a U-shaped out-of-plane hinge 246 that is relatively flexible in the out-of-plane direction and relatively stiff in the in-plane direction. As discussed above in connection with FIGS. 2A and 2B, the output end of each output shaft 220 is coupled to the output coupler 218 by a monopod flexure 222, and the input end of each output shaft 220 is coupled to its associated actuator output leg 212 by another monopod flexure 222. As a result, the output shafts 220 of each of the two actuators 204 are stiff in their respective axial directions and soft or flexible in all other directions. This effectively ensures that each actuator 202 or 204 is capable of exerting forces on the output connector 218 only in an axial direction, and that all cross-talk or cross-coupling between the two actuators 202 and 204 is eliminated. In alternative embodiments, hinge 244 may be implemented as a substantially straight and/or flat (e.g., as opposed to corrugated) in-plane hinge. In additional embodiments, hinge 246 may be coupled to an end of hinge 244 near a center-line of hinge 244 rather than at an off-center edge of an end of hinge 244. In a similar embodiment, hinge 246 may be coupled to an end of shaft 222 near a center-line of shaft 222 rather than at an off-center edge of an end of shaft 222.

It should be noted that actuator device 200 exhibits a number of benefits over other two-DOF actuator implementations. For example, embodiments of actuator device 200 may be fabricated in a smaller area than, for example, a similarly responsive two-DOF actuator device comprising a pair of nested actuators. In general, nested two-DOF actuator devices include a one-DOF actuator situated within another one-DOF actuator. As such, the outer one-DOF actuator must include sufficient structure to support and/or snub the inner one-DOF actuator, and the additional supporting/snubbing structure takes up area that could otherwise be used for comb drive structures, for example. Further, the outer one-DOF actuator must additionally manipulate the full inertia of the inner one-DOF actuator whenever it is energized, and this reduces its available power and general responsiveness, in addition to necessitating an increase in the size of its associated snubbers, which results in an additional loss of area.

Embodiments of the present disclosure (e.g., actuator device 200) may be implemented to alleviate such detriments by interconnecting substantially planar and non-nested one-DOF actuators in a manner that eliminates crosstalk and/or parasitic stiffness (e.g., characteristics analogous to inertial disadvantages in nested designs). Moreover, embodiments of actuator device 200 may be implemented with substantially smaller and/or less complex snubber structures due to, at least in part, their relatively small size and simple motion and/or operation. Because complex snubber structures are often less reliable than simpler snubber structures, in addition to being more costly to fabricate, devices including one or more embodiments of actuator device 200 are typically more reliable and/or cost effective than devices including conventional multiple-DOF actuator devices.

As discussed above, the assembly and electrical wiring of a multiple DOF actuator assembly can take place in a substantially planar fashion by attaching one or more generally planar multiple DOF actuator devices, such as the two-DOF actuator device 200 described above, to a flexible substrate, and the substrate can then be folded into the final three-dimensional configuration necessary to effect the desired orthogonal in-plane and out-of-plane actuations of a payload. FIGS. 5A-5H are top-and-side perspective views of the sequential steps involved in an example embodiment of a method for assembling a miniature lens barrel assembly 500 incorporating a six-DOF actuator assembly 502 utilizing a substrate 504 and a plurality, viz., three, of the two-DOF actuator devices 200 discussed above in connection FIG. 2B.

As illustrated in FIG. 5A, the substrate 504 can comprise, for example, a flexible printed circuit board (PCB) containing conductive traces and bonding pads and comprising, e.g., a suitable dielectric, such as Mylar, Kapton, a fiber reinforced resin, or the like. In the particular example embodiment illustrated in the figures, the substrate 504 is generally Y-shaped, with three arms 506 extending radially outward from a central portion 508. The central portion 508 can include, e.g., a circular central aperture 510 through which light from an image can pass. Of importance, the substrate 504 should be flexible enough to allow the arms to fold downward relative to the central portion 508 about respective fold lines 512 without damaging the substrate 504. This flexibility can be enhanced by, e.g., notching, scribing or indenting the substrate 504 along the fold lines 512 during manufacture or assembly.

As those of some skill will understand, it is desirable to mount the actuator devices 200 slightly above the substrate 504 such that movement of the respective moving frames 216, output legs 212 and drive shafts 200 of the actuator devices 200 are not impeded by friction between the lower surfaces of the foregoing structures and the upper surface of the substrate 504. To this end, a plurality, i.e., at least three, electrically conductive standoffs or solder bumps 514 can be disposed on the upper surfaces of each of the arms 506 of the substrate 504.

If corresponding conductive mounting and connection pads (not illustrated) are provided on the bottom surfaces of the fixed components of the actuator devices 200, e.g., on the L-shaped frames thereof, then, as illustrated in FIG. 5B, respective sets of these conductive mounting and connection pads can be soldered to the standoffs or solder bumps 514 on corresponding ones of the substrate arms 508 in, e.g., a known type of solder reflow operation, and thereby effect several desirable results. For example, the actuator devices 200 will be mounted on the substrate 504 with a slight clearance below the actuator devices to enable free movement of respective moving parts, as above, an electrical connection of the actuator devices 200 to the substrate for the routing of power and control signals can be effected, and the reflow operation can be used to precisely position the actuator devices 200 relative to the substrate 504 and each other. As illustrated in FIG. 5B, after the solder reflow operation, the substrate 504 and actuator devices 200 define a generally planar six-DOF actuator assembly 502 that can be functionally tested in the planar state, e.g., for appropriate motion of the respective output couplers 218 in the orthogonal in-plane directions 226 and 228.

As illustrated in FIG. 5C, in the next step of the method, a generally cylindrical lens barrel 516 is provided for assembly with the actuator assembly 502. The lens barrel 516 can comprise, for example, an injection molded plastic structure having a central lumen 518 corresponding to the central aperture 510 in the central portion 508 of the substrate 504, and flats on its side surface corresponding in location and size to corresponding ones of the arms 506 of the substrate 504. As illustrated in FIG. 5C, the generally planar actuator assembly 502 can be disposed over an upper end of the lens barrel 516 such that the central portion 508 of the substrate 504 is disposed on an upper end of the lens barrel 516 and the central aperture 510 of the substrate 504 is disposed concentric to the central lumen 518 of the lens barrel 516. The central portion 508 of the substrate 504 can then be attached, e.g., by adhesive bonding, to the upper end of the lens barrel 516 such that each of the arms 508 of the substrate 504, each bearing a corresponding one of the actuator devices 200, overhangs an upper edge of a corresponding one of the flats on the sides of the lens barrel 516 at a corresponding one of the fold lines 512 of the substrate 504 discussed above in connection with FIG. 5A. The interim assembly resulting from this step is illustrated in FIG. 5C.

Figure 5G:
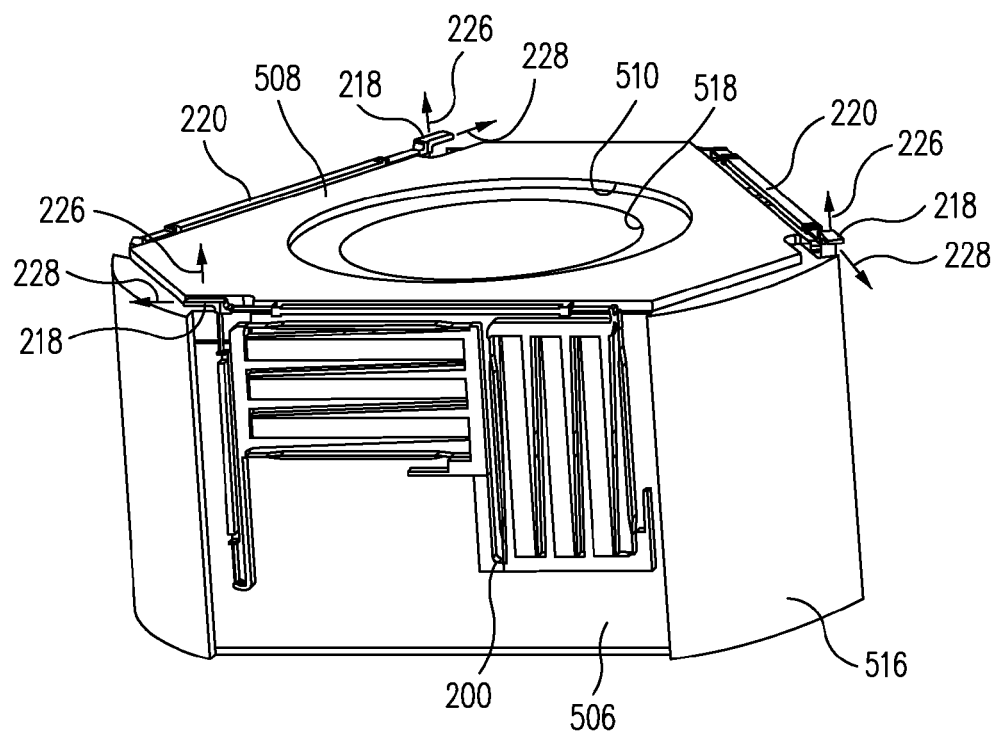

As illustrated in FIGS. 5D-5F, the assembly method proceeds with folding the arms 506 of the substrate 502, each bearing a corresponding one of the actuator devices 200, downward in the direction of the arrows 520 in FIG. 5D, until each of the arms 506 is disposed against a corresponding one of the flats on the side of the lens barrel 516, to which a lower surfaces of the arm 506 can then be bonded using, e.g., a suitable adhesive. The resulting interim lens barrel assembly is illustrated in FIG. 5F and in the enlarged perspective view of FIG. 5G.

In various embodiments, arms 506 may be folded downward by a mechanical press, for example, or through the action of placing a cover over lens barrel 516 (e.g., similar to annular housing 1002 described herein). In other embodiments, arms 506 may be folded downwards by capillary action developed by an adhesive applied to lens barrel 516, such as a liquid or semi-liquid epoxy, for example. In further embodiments, arms 506 may be folded downwards by a combination of one or more of mechanical pressing, cover placement, capillary action, and/or gravity. In still further embodiments, an interim lens barrel assembly, similar to that shown in FIG. 5F, for example, may forego substrate 504 and the various methods of folding arms 506 and, instead, mount actuator devices 200 onto appropriate surfaces of lens barrel 516 using a pick and place machine, for example. In some embodiments, substrate 504 and/or arms 506 may be adhered to lens barrel 516 (e.g., utilizing any of the folding methods described herein) prior to being coupled to actuator devices 200, for example, and one or more actuator devices 200 may subsequently be mounted onto arms 506 by a pick and place machine (e.g., by rotating lens barrel 516 and/or arms 506 in the pick and place machine).

As can be seen in FIG. 5G, the upper surfaces of the output couplings 218 of the actuator devices 200 define a plane that is disposed slightly above and parallel to an upper surface of the of the central portion 508 of the substrate 502, i.e., slightly above the upper surface of the interim lens barrel assembly. Additionally, each of the output couplings 218 is disposed to move in the same two orthogonal directions 226 and 228 discussed above in connection with FIG. 2B. However, as a result of the "folding" steps discussed above in connection with FIGS. 5D-5F, while the direction of movement 228 of each actuator output coupling 218 remains in the plane defined by the upper surfaces of the output couplings 218, the direction of movement 226 of each output coupling 218 is now disposed orthogonal to that plane, i.e., for out-of-plane movement.

Figure 5H:
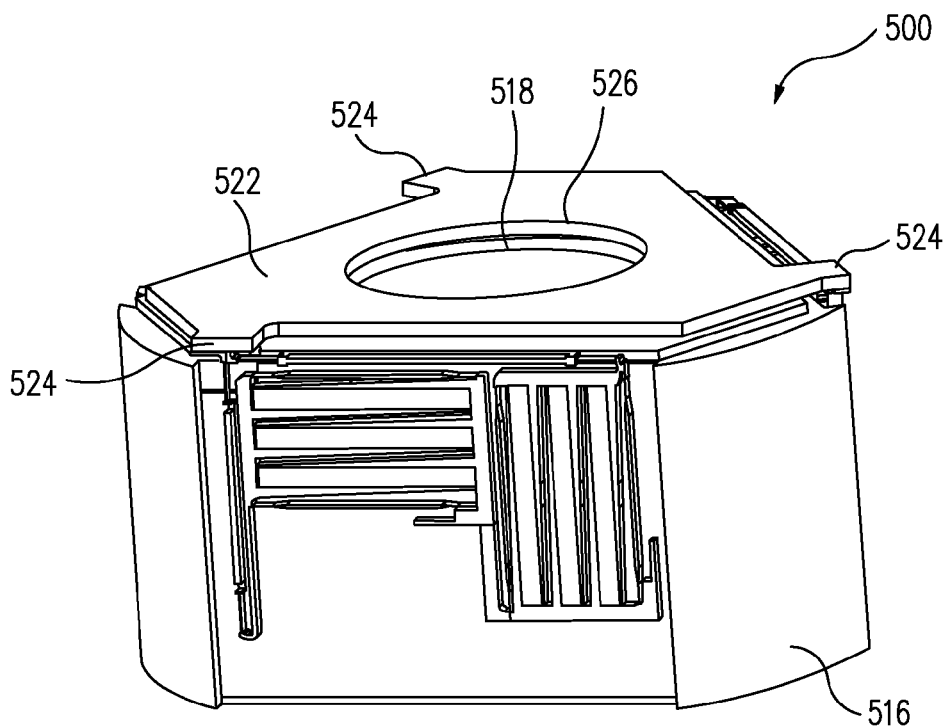

As illustrated in FIG. 5H, a lens support platform 522 can be attached to the upper surfaces of the output couplers 218 of the actuator devices 200 to complete the lens barrel assembly 500. The platform 522 can be generally planar, include tangentially extending arms 524 corresponding in number and relative position of the output couplers 218 of the actuator devices 200, and a central aperture 526 generally corresponding to the central lumen 518 of the lens barrel 516. The platform 522 can be attached, for example, by bonding a lower surface of each of the tangential arms 524 to the upper surface of a corresponding one of actuator output couplers 218. As discussed above in connection with FIG. 1A, the tangential arms 524 of the platform 522 are preferably arranged such that in-plane forces exerted on the platform 522 by the two-DOF actuator devices 200, i.e., in the direction of movement 228, act on the platform 522 tangentially, and out-of-plane forces exerted on the platform 522 by the two-DOF actuator devices 200, i.e., in the direction of movement 226, act perpendicularly thereon. As discussed above, this arrangement results in a lens barrel assembly 500 that is capable of moving the platform 522, and hence, a lens mounted thereon, in six DOFs of movement, viz., ±X, ±Y, ±Z, ±$\theta_X$, ±$\theta_Y$ and ±$\theta_Z$.

It may be noted that, in the particular example embodiment of FIGS. 5A-5F, the two-DOF actuator devices 200 are three in number and are arranged in 120 degree equal angular increments around the circumfery of the substrate 504, i.e., as in the arrangement discussed above in connection with FIG. 1A. However, as discussed in more detail below, the techniques and methods described herein can be used to make a wide variety of useful embodiments of single and multiple DOF actuator assemblies incorporating any practical number of actuator devices and disposed in any practical arrangement desired.

For example, it may be noted in FIGS. 2A and 2B above that if the two-DOF actuator device 200 is split apart along the phantom line 250 extending through the upright leg 206 of the L-shaped support frame, a pair of substantially identical one-DOF actuator devices 202 and 204 are produced that can be used make a wide variety of single- and multiple-DOF actuator assemblies, although as a practical matter, it may be preferable to produce standalone one-DOF actuators 202 or 204 having the same features as those discussed above using the same wafer scale MEMS fabrication techniques used to produce the two-DOF devices 200. In either case, however, as discussed below, the one-DOF actuators 202 or 204 can also be used advantageously to produce a variety of useful actuator assemblies, including six-DOF actuator assemblies.

Thus, as discussed above in connection with FIG. 1B, a six-DOF actuator assembly 100B can be fabricated using six one-DOF actuators 110 arrayed in around an axis, e.g., a Z axis, in an "alternating" hexagonal pattern, i.e., one in which the one-DOF actuators 110 alternately exert in-plane and out-of-plane forces on the payload P.

Figure 6:
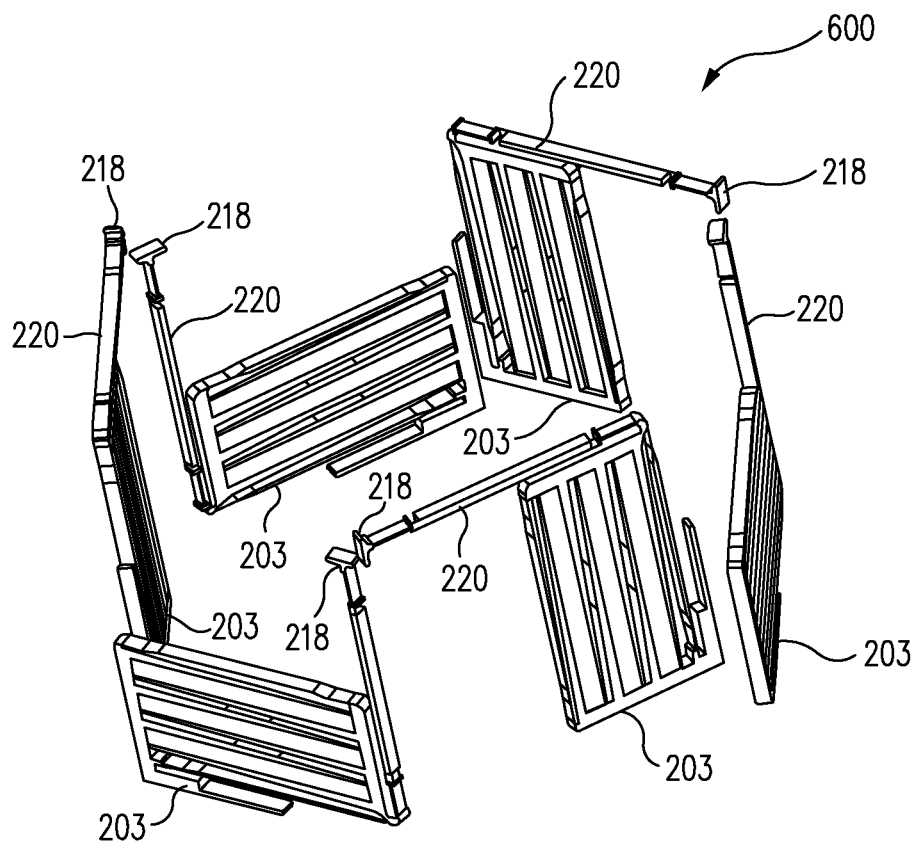
FIG. 6 is a top-and-side perspective view of six example embodiments of one-DOF actuator devices in accordance with an embodiment of the disclosure, shown disposed in a hexagonal arrangement.
Figure 7:
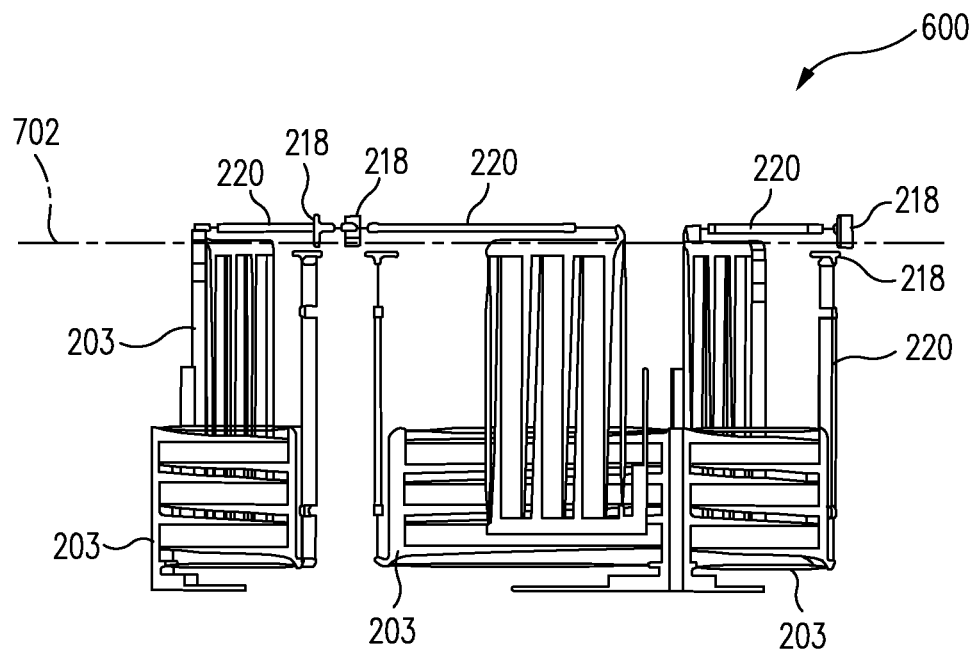
FIG. 7 is a side elevation of the hexagonal arrangement of the example one-DOF actuator devices of FIG. 6 in accordance with an embodiment of the disclosure.

FIG. 6 is a top-and-side perspective view of six example embodiments of one DOF actuator devices 203 in accordance with the present invention, shown disposed in such an alternating hexagonal arrangement 600, and FIG. 7 is a side elevation of the hexagonal arrangement 600. As can be seen in FIGS. 6 and 7, the one-DOF actuators 203 are substantially identical to each other, except that the actuators and their respective output shafts 220 and output couplers 218 are arranged to exert forces alternately in in-plane and an out-of-plane directions, respectively. As in the embodiment of FIGS. 5A-5H discussed above, the upper surfaces of the output couplers 218 of the out-of-plane actuators 303 define a plane 702 within which the output couplers 218 of the in-plane actuators 203 move rectilinearly. Additionally, it can be noted in FIGS. 6 and 7 that the output couplers 218 of adjacent ones of the actuators 203 are disposed immediately adjacent to each other.

Figure 8:
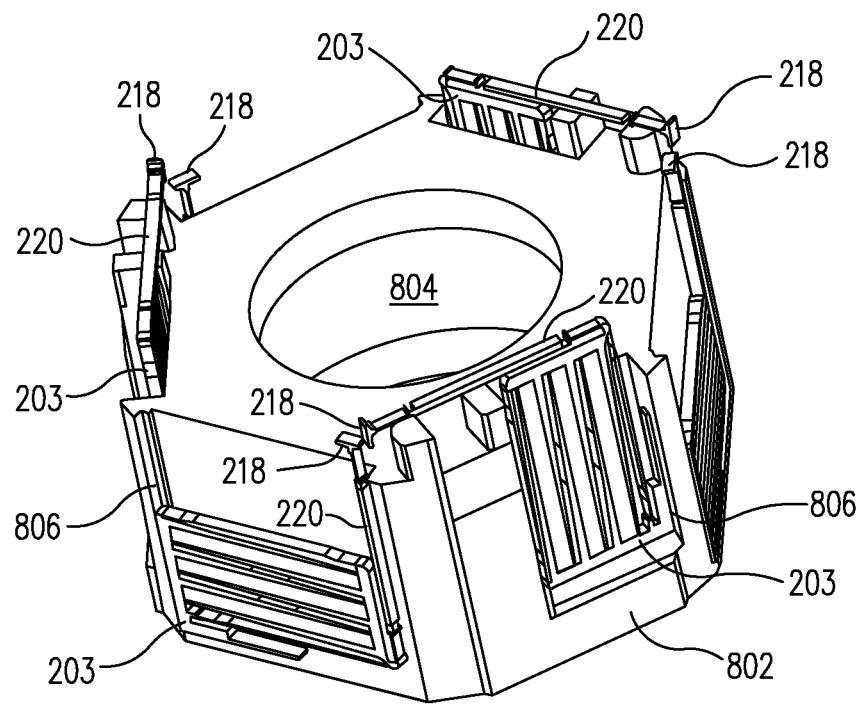
FIG. 8 is a top-and-side perspective view of the hexagonal arrangement of the example one-DOF actuator devices of FIG. 6, showing the devices respectively disposed over a corresponding side surface of a hexagonal barrel to form an example lens barrel assembly in accordance with an embodiment of the disclosure.

As illustrated in FIG. 8, the hexagonal pattern 600 of the one-DOF actuators 203 can be superimposed onto the generally planar side surfaces of a hexagonal lens barrel 802 in a manner similar to that discussed above in connection with FIGS. 5A-5H, in which each of the actuators 203 occupies a corresponding flat on the lens barrel 802. The lens barrel 802 can be fabricated from, e.g., an injection molded plastic to include a central lumen 804 within which, for example, one or more fixed lenses (not illustrated) can be disposed. The hexagonal pattern 600 can, for example, be superimposed onto the lens barrel 802 using the fold-down substrate technique discussed above in connection with FIGS. 5A-5H. Alternatively, the actuators 203 can be attached directly to the flats of the lens barrel 802, e.g., using three-sided recesses 806 surrounding the flats in the lens barrel 802 to precisely align the actuators 203, but with due regard being had for the requirements of providing a slight clearance between the actuators 203 and their respective mounting surfaces and conveying electrical power and control signals to the actuators 203, as discussed above.

Figure 9:
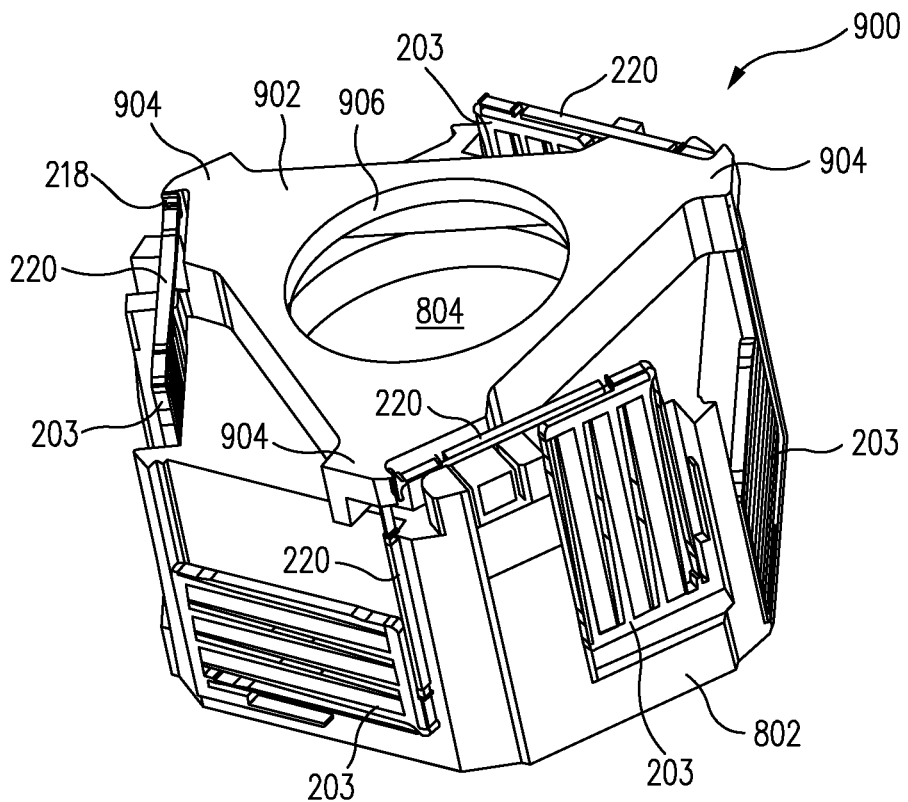
FIG. 9 is a top-and-side perspective view of the lens barrel assembly, showing an example embodiment of a support platform for an optical element coupled to a corresponding output connector of each of the actuator devices in accordance with an embodiment of the disclosure.

As illustrated in FIG. 9, a lens support platform 902 can be attached to the upper surfaces of the respective output couplers 218 of the out-of-plane actuators 203 in a manner similar to that discussed above in connection with the embodiment of FIG. 5H. As in that embodiment, the support platform 902 can be generally planar, include tangentially extending arms 904 corresponding in number and relative position of the output couplers 218 of the out-of-plane actuator devices 203, and a central aperture 906 generally corresponding to the central lumen 804 of the lens barrel 802. And, as above, the tangential arms 904 of the platform 902 are preferably arranged such that in-plane forces exerted on the platform 902 by the output couplers 218 of the in-plane actuators 203 act tangentially on the platform 902, and out-of-plane forces exerted on the platform 902 by the output couplers 218 of the out-of plane actuators 203 act perpendicularly thereon. As discussed above, this arrangement results in a lens barrel assembly 900 that is capable of moving the platform 902, and hence, a lens mounted thereon, in six DOFs of movement, viz., ±X, ±Y, ±Z, ±θ$_X$, ±θ$_Y$ and ±θ$_Z$.

Figure 10:
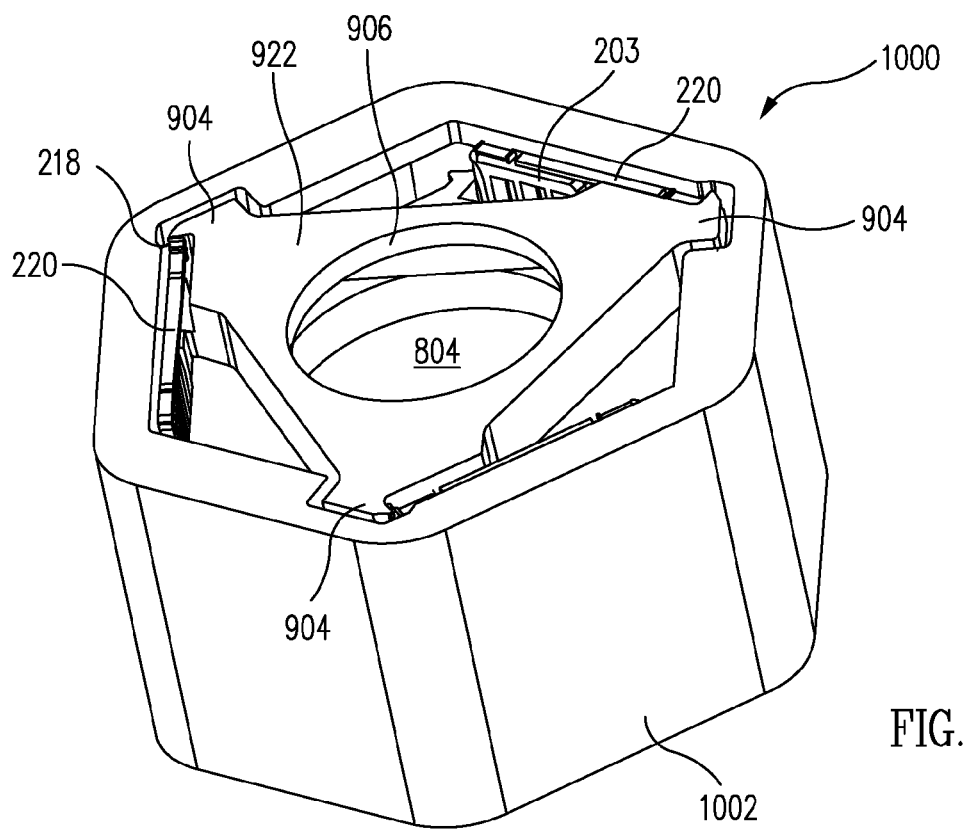
FIG. 10 is a top-and-side perspective view of the lens barrel and support platform assembly of FIG. 9, shown disposed within a concentric protective housing in accordance with an embodiment of the disclosure.

As illustrated in FIG. 10, in some embodiments, an annular housing 1002 can be disposed concentrically around the lens barrel assembly 900 to protect the actuators 203 and lens mounting platform 902 from, e.g., dirt and moisture. The protective housing can also be fabricated from an injection molded plastic, and can be configured to mount on the lens barrel assembly 900 in a snap-on fashion. Further, as discussed in more detail below, in some embodiments, an imaging device (not illustrated), such as a digital camera image sensor (i.e., a "camera on a chip") can be disposed at the base of the lens barrel assembly 900 to convert it to a miniature camera module 1000.

Figure 11:
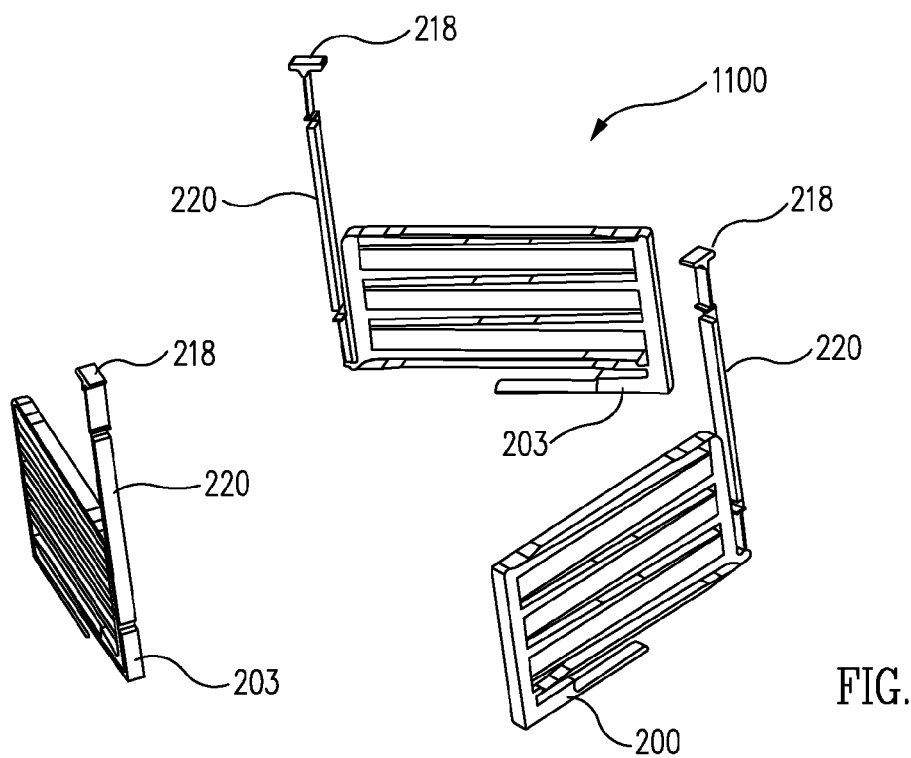
FIG. 11 is a top-and-side perspective view of three example one-DOF actuator devices, shown disposed in a triangular arrangement in accordance with an embodiment of the disclosure.

FIG. 11 is a top-and-side perspective view of three of the example one-DOF actuators 203 disposed in an arrangement 1100 corresponding to the sides of an equilateral triangle. It may be noted that in the actuator arrangement 1100, the output shafts 220 of the actuators 203 are all directed vertically, i.e., out-of-plane, and that the respective upper surfaces of the output couplers 218 all face up.

Figure 12:
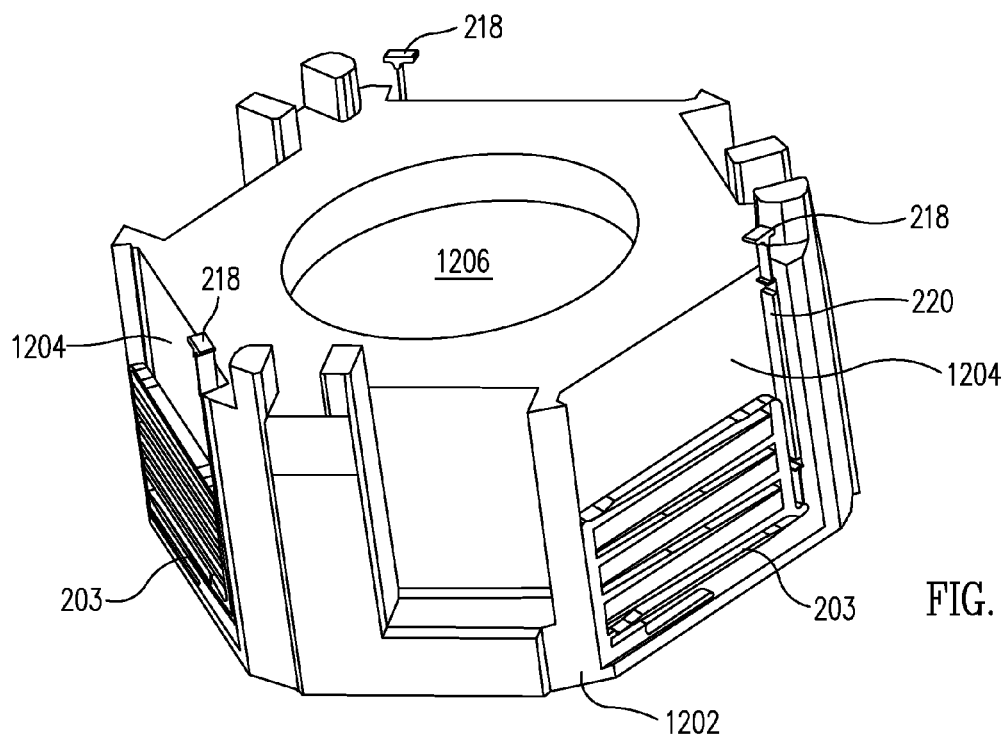
FIG. 12 is a top-and-side perspective view of the triangular arrangement of the example one-DOF actuator devices, showing the devices respectively disposed over alternating ones of corresponding side surfaces of a hexagonal barrel to form another example embodiment of a lens barrel assembly in accordance with an embodiment of the disclosure.

As illustrated in FIG. 12, the triangular arrangement 1100 of the actuators 203 can be superimposed on the generally planar side surfaces 1204 of a lens barrel 1202 having a central lumen 1206 in a manner similar to that discussed above in connection with FIG. 8, i.e., using either the fold-down substrate technique described above in connection with FIGS. 5A-5H or by using a direct attachment technique.

Figure 13:
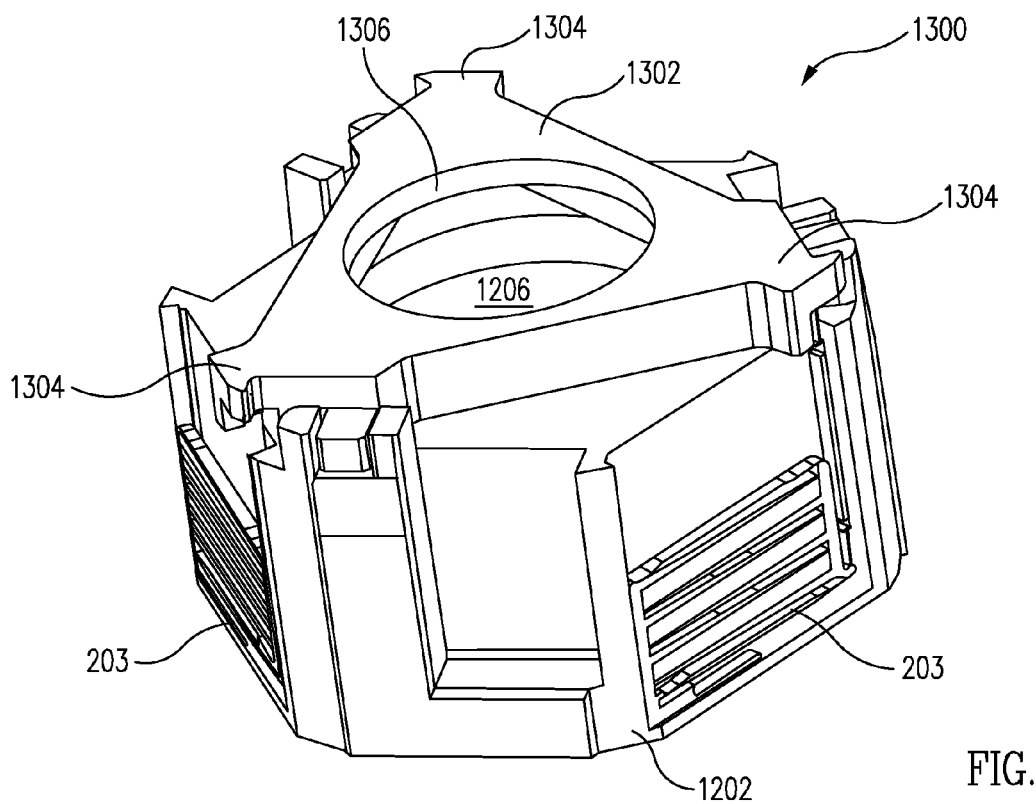
FIG. 13 is a top-and-side perspective view of the lens barrel assembly of FIG. 12, showing another example embodiment of an optical element support platform coupled to corresponding ones of the output connectors of the actuator devices in accordance with an embodiment of the disclosure.

As illustrated in FIG. 13, in a manner similar to that discussed above in connection with FIG. 9, a lens support platform 1302 can be attached to the upper surfaces of the respective output couplers 218 of the out-of-plane actuators 203 in a manner similar to that discussed above in connection with the embodiments of FIGS. 5H and 9. As in those embodiments, the support platform 1302 can be generally planar, include radial arms 1304 corresponding in number and relative position of the output couplers 218 of the out-of-plane actuator devices 203, and a central aperture 1306 generally corresponding to the central lumen 1206 of the lens barrel 1202. The radial arms 1304 of the platform 1302 are respectively coupled to the upper surfaces of the output couplers 218 such that the out-of-plane forces exerted on the platform 1302 by the output couplers 218 of the out-of plane actuators 203 act normal thereon. As those of some skill will understand, this arrangement results in a lens barrel assembly 1300 that is capable of moving the platform 1302, and hence, a lens mounted thereon, in three DOFs of movement, viz., ±Z, θ$_X$ and θ$_Y$.

Figure 14A:
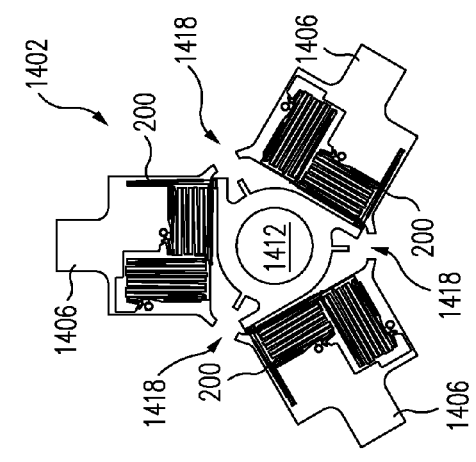
FIGS. 14A-14E are top plan views of the sequential steps of an example embodiment of a method for assembling an example embodiment of a miniature camera module utilizing a plurality of the two-DOF actuator devices of FIG. 2B in accordance with an embodiment of the disclosure.
Figure 14B:
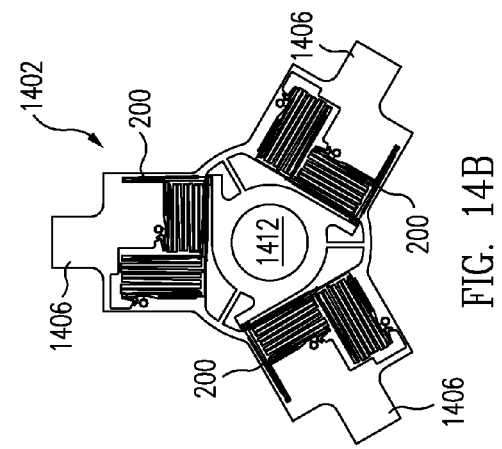
Figure 14C:
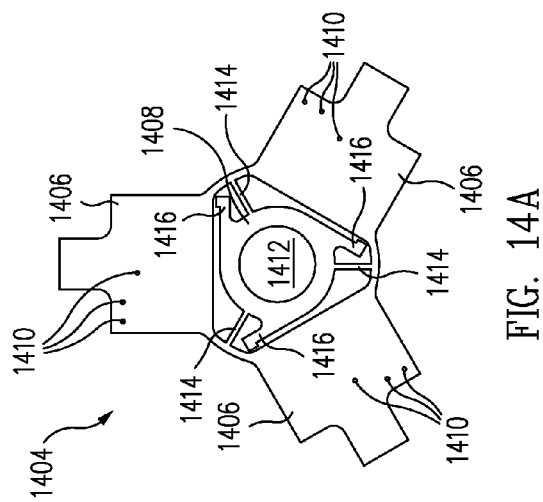
Figure 14D:
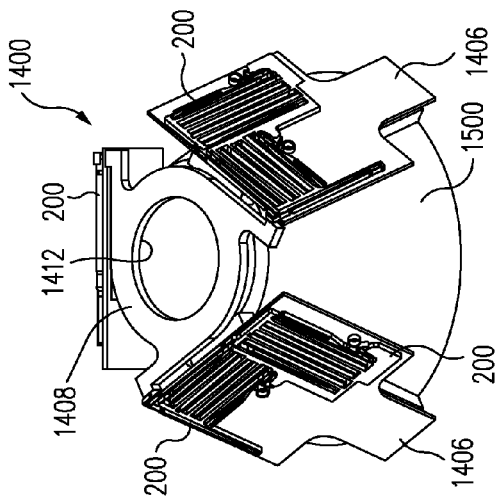
Figure 14E:
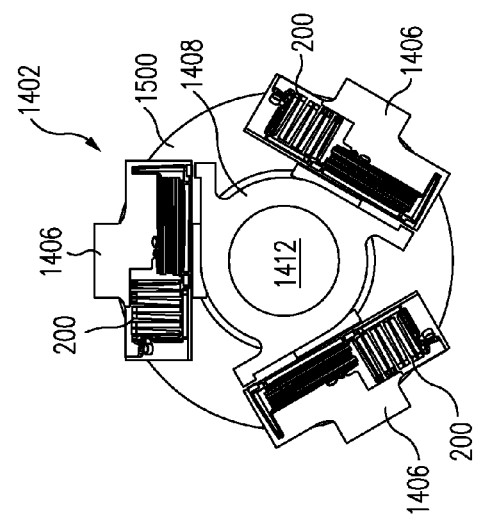
Figure 14F:
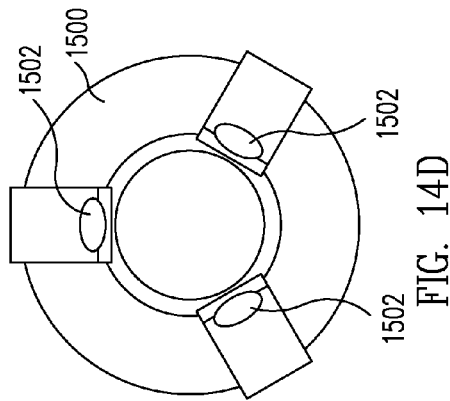
FIG. 14F is a top-and-side perspective view of the example camera module.

FIGS. 14A-14E are top plan views of the sequential steps of an example embodiment of a method for assembling an example embodiment of a miniature camera module 1400 incorporating a six-DOF actuator assembly 1402 utilizing a plurality of the two-DOF actuator devices 200 of FIG. 2B in accordance with the present invention, and FIG. 14F is a top-and-side perspective view of the example camera module 1400.

As discussed above in connection with FIGS. 5A-5H, the example method of FIGS. 14A-14F can make use of the fold-down substrate technique, including mechanical pressing, cover placement, adhesive capillary action, gravity, and other techniques described herein. Thus, as illustrated in FIG. 14A, the substrate 1404 can comprise, for example, a single-layer flexible PCB containing conductive traces and bonding pads and fabricated of a suitable dielectric material. In the particular example embodiment illustrated in the figures, the substrate 1404 is generally Y-shaped, with three arms 1406 extending radially outward from a central portion 1408. As above, each arm 1406 of the substrate 1404 can be provided with at least three conductive pads or standoffs 1410, e.g., solder bumps, for mounting and making electrical connections with the actuator devices 200, as described above.

The central portion 1408 of the substrate 1404 can include, e.g., a circular central aperture 1412 within which, for example, a lens (not illustrated) can be mounted. Additionally, the central portion 1408 can be coupled to the arms 1406 by a plurality of connector parts 1414 that are subsequently cut away to free the central portion 1408 from the pads for movement relative thereto in a manner discussed below. Additionally, the central portion 1408 can be reinforced with a laminated stiffener corresponding to shape of the central portion 1408 so as to define a lens mounting platform of the types described above in connection with FIGS. 5H, 9 and 13. Thus the laminated central portion/stiffener 1408 can include, for example, a central aperture corresponding the central aperture 1412 in the central portion 1408, and three tangentially extending arms 1416.

Since the manner of assembly of the six-DOF actuator assembly 1402 and its superimposition on the associated frusto-conical lens barrel 1500 described in more detail below is substantially similar to that described above in connection with FIGS. 5A-5H, further description thereof is omitted here for the sake of brevity, except to note the following differences.

In particular, FIG. 14C illustrates a step in which the connector parts 1414 can be cut away in the areas indicated by the arrows 1418 to free the mounting platform defined by the central portion/stiffener lamination 1408 discussed above from the substrate arms 1406 for its independent movement in six DOFs relative to the substrate. In some embodiments, only the portion of connector parts 1414 radially connecting to central portion 1408 may be cut, for example, and the remaining uncut portions of connector parts 1414 may be used to support one or more electrically and/or thermally conductive traces between one or more of actuator devices 200.

Further, as illustrated in, e.g., FIGS. 14D-14F, since the associated lens barrel 1500 is generally frusto-conical in shape, it may be desirable in some embodiments to provide flats 1502 on the lens barrel 1500, as illustrated in FIG. 14D, to provide convenient surfaces for the attachment of the arms 1406 of the actuator assembly 1402 to the lens barrel 1500, e.g., with an adhesive bond. Lastly, as can be seen in FIG. 14F, when the actuator assembly 1402 is affixed to the frusto-conical lens barrel 1500 to form the six-DOF miniature camera module 1400, the respective out-of-plane actuators 202 of the two-DOF actuator devices 200 are disposed so as to act on the mounting platform 1408 at an angle corresponding to the slope of the sides of the camera module 1500, rather than vertically, as in the embodiments described above in connection with, e.g., FIGS. 5H, 9 and 13.

Figure 15A:
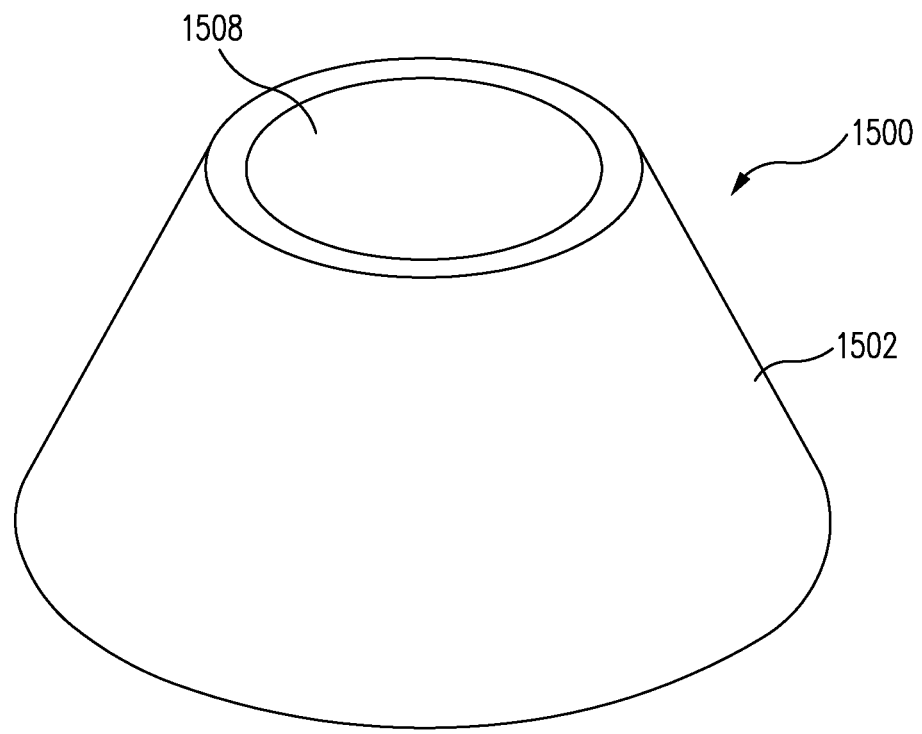
FIGS. 15A and 15B are top plan and elevational cross-sectional views, respectively, of an example embodiment of a frustoconical lens barrel of a type useful in the example miniature camera module of FIGS. 14A-14F in accordance with an embodiment of the disclosure.
Figure 15B:
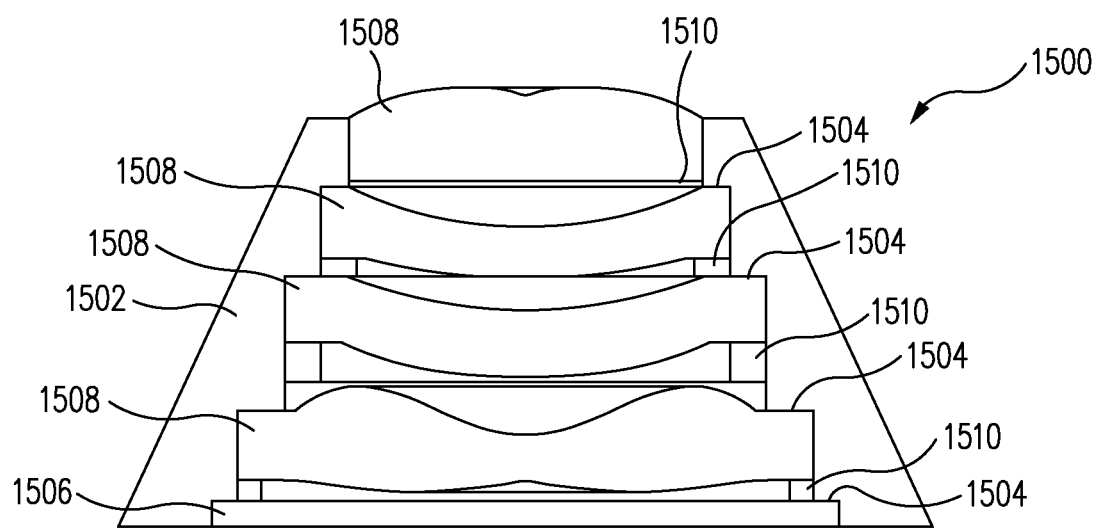

FIGS. 15A and 15B are top plan and elevational cross-sectional views, respectively, of an example embodiment of the frustoconical miniature camera lens barrel 1500 of type 5 used in the example miniature camera module 1400 of FIGS. 14A-14F in accordance with the present invention. As can be seen in these figures, the lens barrel 1500 comprises a frusto-conical housing 1502, which can be fabricated of, e.g., an injection molded plastic, e.g., polyurethane, to include a plurality of stepped recesses 1504 respectively configured to receive a corresponding one of an image sensor 1506 or a plurality of fixed lenses 1508, some of which can comprise compound lenses, forming the photographic objective of the camera module 1400. As illustrated in FIG. 15B, annular spacers 1510 can be used to separate and space the image sensor 1506 and lenses 1508 apart from each other at the appropriate distances, and the lenses 1508 and the image sensor 1506 can be bonded permanently in place with, e.g., a suitable adhesive.

Figure 16A:
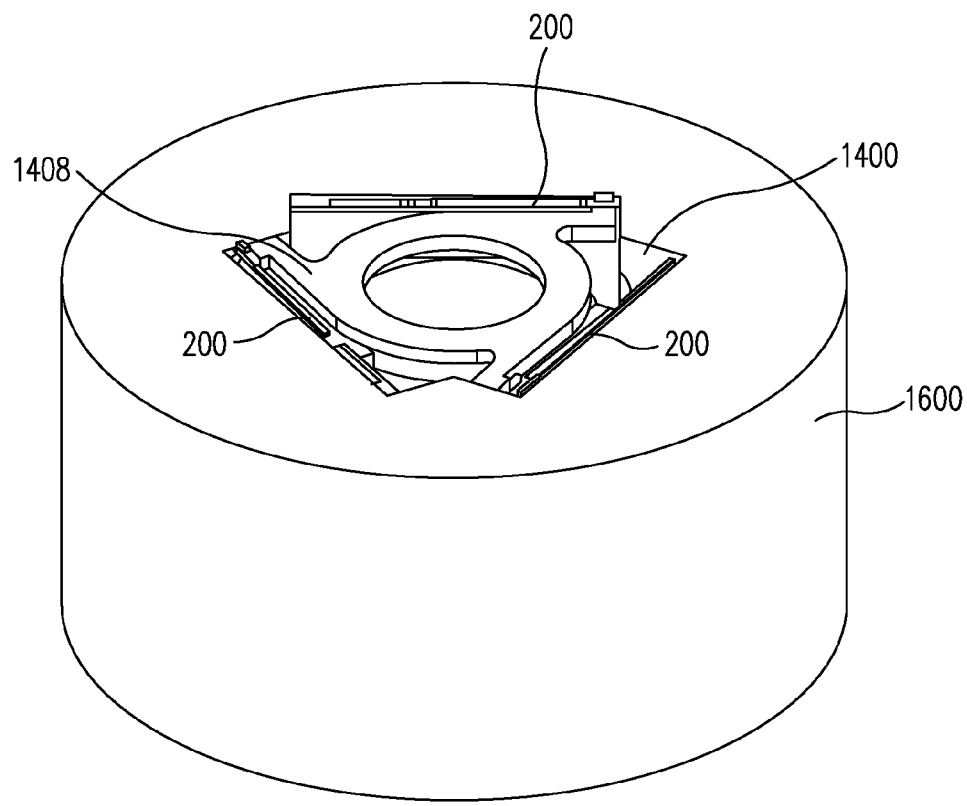
FIGS. 16A and 16B are top-and-side perspective and elevational cross-sectional views, respectively, of the miniature camera module of FIGS. 14A-14F, shown surrounded by a concentric protective housing in accordance with an embodiment of the disclosure.
Figure 16B:
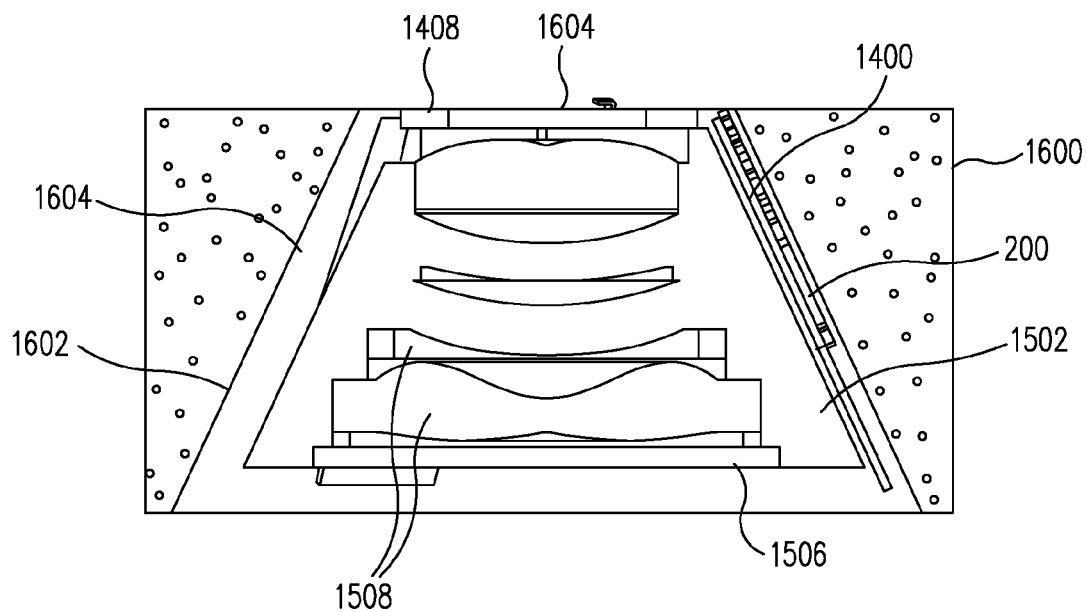

FIGS. 16A and 16B are top-and-side perspective and elevational cross-sectional views, respectively, of the miniature camera module 1400 of FIGS. 14A-14F, shown surrounded by a concentric protective housing 1600. In the particular embodiment illustrated, the housing 1600 has a substantially cylindrical outer circumference and a frusto-conical central bore, or lumen 1602, having an interior surface that generally conforms to the frusto-conical outer surface of the lens barrel 1500 so as to create a protected space 1604 around the actuator devices 200 of the actuator assembly 1400. The protective cover can comprise, e.g., an injection molded plastic, and as illustrated in FIG. 16B, a single objective lens 1606 can be mounted on the mounting platform 1408 for movement by the actuators 200 of the actuator assembly 1400 in six DOFs.

Figure 17:
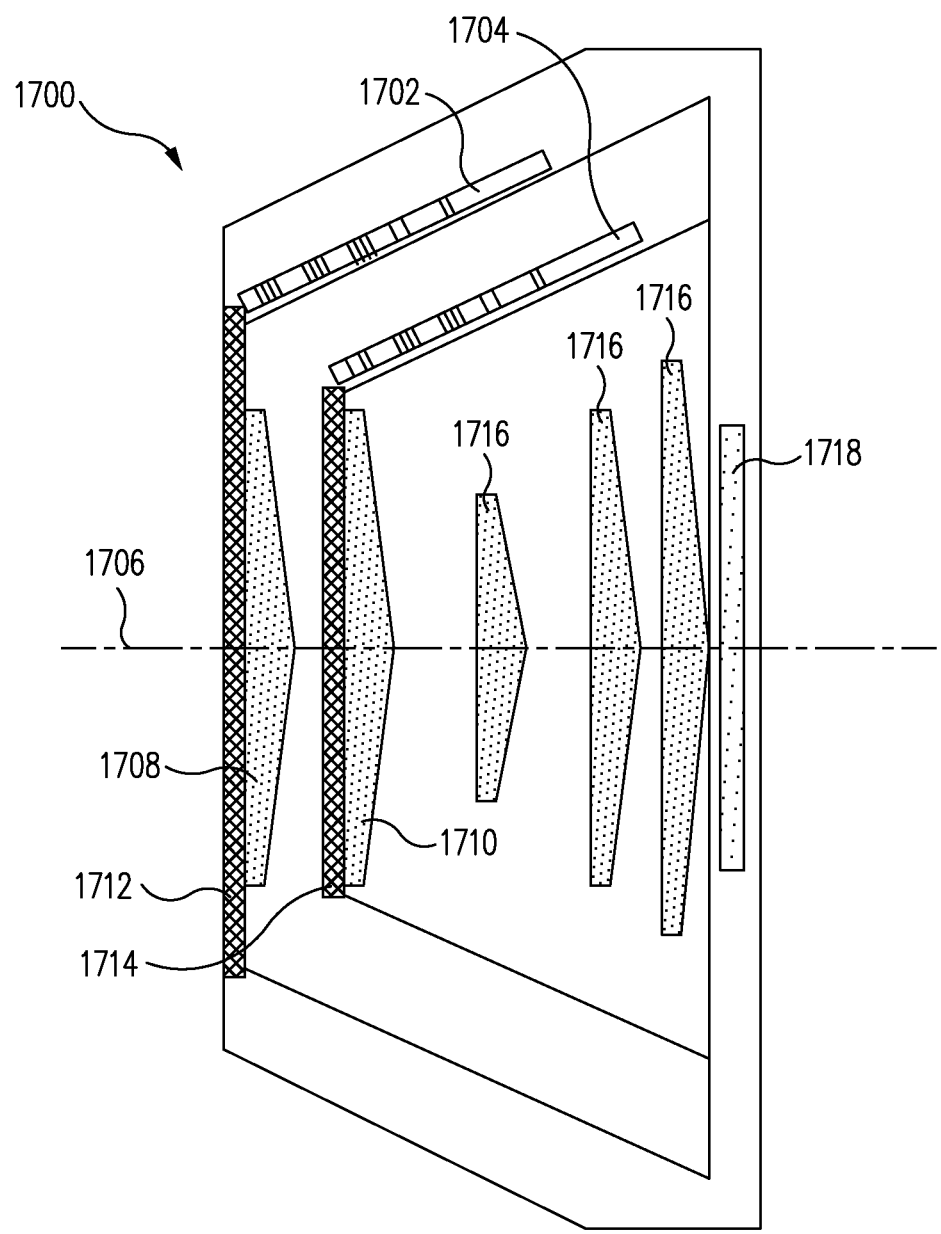
FIG. 17 is a schematic cross-sectional side elevation view of another example embodiment of a miniature camera module in accordance with an embodiment of the disclosure, showing a pair of actuator assemblies for moving corresponding ones of a pair of lenses independently of each other and relative to a plurality of fixed lenses and an image sensor disposed within the example camera module.

FIG. 17 is a schematic cross-sectional side elevation view of another example embodiment of a miniature camera module 1700 in accordance with the present invention. As illustrated in FIG. 17 the example camera module 1700 comprises first and second actuator assemblies 1702 and 1704 of the type discussed above in connection with FIGS. 14A-14F, which are disposed along an optical axis 1706 of the camera module 1700 to move corresponding ones of two lenses 1708 and 1710 respectively mounted on mounting platforms 1712 and 1714 independently of each other and relative to a plurality of fixed lenses 1716 and an image sensor 1718 disposed within the example camera module 1700 so as to effect, for example a zooming function. Either or both of the actuator assemblies 1702 can comprise either three- or six-DOF actuators of the types discussed above. As those of some skill will appreciate, the fold-down substrate technique for forming the actuator assemblies discussed above, coupled with the tapering outer surface of the frusto-conical shape of the associated lens barrel enables any practical number of independent actuator assemblies to be "staged" along the optical axis 1706 of the camera module 1700 without unduly increasing the diameter of the module.

In light of the foregoing description, it should be clear that many modifications, substitutions and variations can be made in and to the materials, apparatus, configurations and methods of use the multiple DOF actuator assemblies of the present disclosure, and in light of this, that the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. An actuator assembly, comprising:
a planar mounting platform arranged within a first plane;
a plurality of first type planar actuators configured to move the planar mounting platform in directions within the first plane; and
a plurality of second type planar actuators configured to move the planar mounting platform in directions perpendicular to the first plane,
wherein the plurality of the first and the second actuators are arranged around the planar mounting platform in a manner alternating between the first type planar actuator and the second type planar actuator.

2. The actuator assembly of claim 1, wherein each of the plurality of the first type planar actuators and the plurality of the second type planar actuators allows a distinct degree of freedom (DOF) for moving the planar mounting platform.

3. The actuator assembly of claim 1, wherein immediately adjacent ones of the first type and the second type planar actuators are bent from each other to form an angle therebetween.

4. The actuator assembly of claim 1, wherein each of the plurality of the first type planar actuators and the plurality of the second type planar actuators comprises an elongated output shaft having an output end coupled to an output coupler that is coupled to the planar mounting platform.

5. The actuator assembly of claim 4, wherein the elongated output shafts of the first type planar actuators extend in directions parallel to the first plane and the elongated output shafts of the second type planar actuators extend in directions perpendicular to the first plane.

6. The actuator assembly of claim 4, wherein upper surfaces of the output couplers of the second type planar actuators define a plane within which the output couplers of the first type planar actuators are configured to move rectilinearly.

7. The actuator assembly of claim 1, wherein each of the plurality of the first type planar actuators and the plurality of the second type planar actuators comprises an electrostatic comb drive actuator.

8. The actuator assembly of claim 7, wherein the electrostatic comb drive actuator comprises:
a fixed frame;
a moving frame coupled to the fixed frame by a flexure for substantially coplanar, perpendicular movement relative to the fixed frame; and
a plurality of interdigitated teeth, a first group of which is attached to the fixed frame and a second group of which is attached to the moving frame.

9. A camera, comprising:
the actuator assembly of claim 1;
a lens barrel having a plurality of flats distributed around a circumferential surface of the lens barrel,
wherein the planar mounting platform is disposed at an end of the lens barrel and each of the first type and the second type planar actuators is disposed on a corresponding one of the flats.

10. A method of operating the actuator assembly of claim 1, the method comprising:
moving the planar mounting platform in directions within the first plane by actuating one or more of the first type planar actuators; and
moving the planar mounting platform in directions perpendicular to the first plane by actuating one or more of the second type planar actuators.

11. A lens barrel assembly, comprising:
a lens barrel; and
an actuator assembly attached to the lens barrel, the actuator assembly comprising:
- a planar mounting platform arranged within a first plane;
- a plurality of first type planar actuators configured to move the planar mounting platform in directions within the first plane; and
- a plurality of second type planar actuators configured to move the planar mounting platform in directions perpendicular to the first plane, wherein the plurality of the first and the second actuators are arranged around the planar mounting platform in an manner alternating between the first type planar actuator and the second type planar actuator.

12. The lens barrel assembly of claim 11, wherein the lens barrel comprises an upper end and wherein the planar mounting platform is attached to the upper end.

13. The lens barrel assembly of claim 12, wherein the lens barrel comprises a plurality of flats distributed around a circumferential surface of the lens barrel, and wherein each of the first type and the second type planar actuators is disposed on a corresponding one of the flats.

14. The lens barrel assembly of claim 13, wherein the lens barrel comprises six flats distributed around the circumferential surface of the lens barrel to form a hexagonal prism shape and wherein the actuator assembly comprises three first type planar actuators and three second type planar actuators respectively disposed on the six flats.

15. The lens barrel assembly of claim 11, wherein the lens barrel comprises a central lumen and wherein the planar mounting platform comprises an aperture that is aligned with the central lumen so that light from an image can pass through the aperture and the central lumen.

16. The lens barrel assembly of claim 15, further comprising an optical element mounted within the aperture.

17. A camera comprising the lens barrel assembly of claim 11 and a lens coupled to the planar mounting platform for multidimensional movement thereof when one or more of the first type and the second type planar actuators are actuated.

18. A method of making the lens barrel assembly of claim 11, the method comprising:
- forming the planar mounting platform and the first type and the second type planar actuators in the first plane;
- folding each of the first type and the second type planar actuators out of the first plane; and
- superimposing the first type and second type planar actuators onto corresponding side surfaces of the lens barrel with the planar mounting platform disposed on an upper end of the lens barrel.

19. A method of making the lens barrel assembly of claim 11, the method comprising:
- forming the first type and the second type planar actuators in the first plane; and
- attaching each of the first type and the second type planar actuators to a corresponding one of side flats of the lens barrel by aligning with a three-sided recesses form in the corresponding one of the side flats.

20. A method of operating the lens barrel assembly of claim 11, the method comprising moving a lens that is coupled to the planar mounting platform by actuating at least one of the first type and the second type planar actuators to effect autofocus, zooming and/or image stabilization functions for a camera.

* * * * *